US012001989B2

(12) United States Patent
Ertl

(10) Patent No.: US 12,001,989 B2
(45) Date of Patent: Jun. 4, 2024

(54) OPTIMIZING CLOUD-BASED IT-SYSTEMS TOWARDS BUSINESS OBJECTIVES: AUTOMATIC TOPOLOGY-BASED ANALYSIS TO DETERMINE IMPACT OF IT-SYSTEMS ON BUSINESS METRICS

(71) Applicant: Dynatrace LLC, Waltham, MA (US)

(72) Inventor: Otmar Ertl, Linz (AT)

(73) Assignee: Dynatrace LLC, Waltham, MA (US)

( * ) Notice: Subject to any disclaimer, the term of this patent is extended or adjusted under 35 U.S.C. 154(b) by 10 days.

(21) Appl. No.: 17/585,068

(22) Filed: Jan. 26, 2022

(65) Prior Publication Data
US 2022/0245552 A1  Aug. 4, 2022

Related U.S. Application Data

(60) Provisional application No. 63/145,012, filed on Feb. 3, 2021.

(51) Int. Cl.
*G06Q 10/0639* (2023.01)
*G06F 11/30* (2006.01)
(Continued)

(52) U.S. Cl.
CPC ..... *G06Q 10/06393* (2013.01); *G06F 11/301* (2013.01); *G06Q 10/0633* (2013.01); *H04L 67/1042* (2013.01)

(58) Field of Classification Search
CPC ............ G06Q 10/6393; G06Q 10/0633; G06F 11/301; H04L 67/1042
See application file for complete search history.

(56) References Cited

U.S. PATENT DOCUMENTS

| 8,762,236 B1* | 6/2014 | Shirey | ............ G06Q 20/10 705/64 |
| 9,459,984 B2* | 10/2016 | Bratanov | ............ G06F 9/45533 |

(Continued)

FOREIGN PATENT DOCUMENTS

CA        3039198 A1 *  4/2018  ............ G06F 11/302

OTHER PUBLICATIONS

Zhou et al. "A Time-Ordered Aggregation Model-Based Centrality Metric for Mobile Social Networks" (2018) (retrieved from https://ieeexplore.ieee.org/stamp/stamp.jsp?arnumber=8352590)(Year: 2018).*

*Primary Examiner* — Sujay Koneru
(74) *Attorney, Agent, or Firm* — Harness, Dickey & Pierce, P.L.C.

(57) ABSTRACT

A system and method is proposed for estimating the contribution of components of a distributed computing environment to the generation of economically relevant values, like e.g., revenue numbers. Agents are deployed to the computing environment that trace executed transactions and that monitor components used to execute those transactions. The transaction trace data also contains data about the origin/user of transactions, which may be used to group transactions corresponding to particular interactions of individual users with the monitored application into visit data. Data describing economically relevant activities of transactions, like the purchase of goods, are also observed by agents and reported in trace data. Functional dependencies described in transaction trace data and resource related dependencies derived from component monitoring data are used to identify functionality and components that contributed to the generation of business value. The generated business value is assigned to contributing components to incrementally create data describing the economic value of those components. The so (Continued)

Business Value Propagation Example generated data can be used for various business-related analyses.

28 Claims, 11 Drawing Sheets

(51) Int. Cl.
  *G06Q 10/0633* (2023.01)
  *H04L 67/1042* (2022.01)

(56) References Cited

U.S. PATENT DOCUMENTS

| | | | |
|---|---|---|---|
| 9,571,591 B2 | 2/2017 | Greifeneder et al. | |
| 9,898,385 B1* | 2/2018 | O'Dowd | G06F 11/3476 |
| 10,373,094 B2 | 8/2019 | Naous et al. | |
| 10,635,566 B1 | 4/2020 | Talluri et al. | |
| 10,896,421 B2 | 1/2021 | Adjaoute | |
| 10,929,415 B1* | 2/2021 | Shcherbakov | G06F 16/26 |
| 11,159,599 B2 | 10/2021 | Greifeneder et al. | |
| 2005/0049924 A1* | 3/2005 | DeBettencourt | G06F 11/3495 705/21 |
| 2008/0065400 A1* | 3/2008 | Bhargava | G06F 11/3612 705/7.26 |
| 2009/0049429 A1* | 2/2009 | Greifeneder | G06F 11/3495 717/128 |
| 2009/0077135 A1* | 3/2009 | Yalamanchi | G06F 16/2336 |
| 2009/0204696 A1* | 8/2009 | Zhang | H04L 67/62 709/223 |
| 2012/0259793 A1* | 10/2012 | Umansky | G06Q 10/06 705/348 |
| 2012/0260133 A1* | 10/2012 | Beck | G06F 11/323 714/38.1 |
| 2012/0260135 A1* | 10/2012 | Beck | G06F 11/323 714/E11.181 |
| 2013/0124631 A1* | 5/2013 | Rosansky | H04L 65/403 709/204 |
| 2013/0185643 A1 | 7/2013 | Greifeneder et al. | |
| 2013/0275231 A1* | 10/2013 | Paharia | G06Q 30/02 705/14.66 |
| 2014/0282586 A1* | 9/2014 | Shear | G06F 16/245 718/104 |
| 2014/0310034 A1* | 10/2014 | Li | G06Q 10/06393 705/7.11 |
| 2015/0052441 A1 | 2/2015 | Degioanni | |
| 2015/0066782 A1* | 3/2015 | Vainberg | G06Q 10/20 705/305 |
| 2016/0063356 A1* | 3/2016 | Gukal | G06V 40/20 382/173 |
| 2016/0080422 A1* | 3/2016 | Belgodere | G06N 5/048 706/47 |
| 2016/0105350 A1 | 4/2016 | Greifeneder et al. | |
| 2017/0039554 A1* | 2/2017 | Greifeneder | G06Q 20/389 |
| 2017/0061313 A1* | 3/2017 | Oros | G06F 11/3409 |
| 2017/0085545 A1* | 3/2017 | Lohe | G06Q 20/065 |
| 2017/0177546 A1* | 6/2017 | Heinz | G06T 11/206 |
| 2018/0091620 A1* | 3/2018 | Singh | G06Q 10/1095 |
| 2018/0287876 A1* | 10/2018 | Strobel | H04L 41/142 |
| 2019/0095239 A1* | 3/2019 | Giral | G06F 9/466 |
| 2019/0266502 A1* | 8/2019 | Moser | G06F 11/3409 |
| 2019/0354461 A1* | 11/2019 | Krishnamoorthy | G06F 11/3034 |
| 2020/0272283 A1* | 8/2020 | Sarin | G06N 20/10 |
| 2020/0311790 A1* | 10/2020 | Keren | G06Q 20/4016 |
| 2020/0409933 A1 | 12/2020 | Ertl | |
| 2021/0263769 A1* | 8/2021 | Du | G06F 8/41 |

* cited by examiner

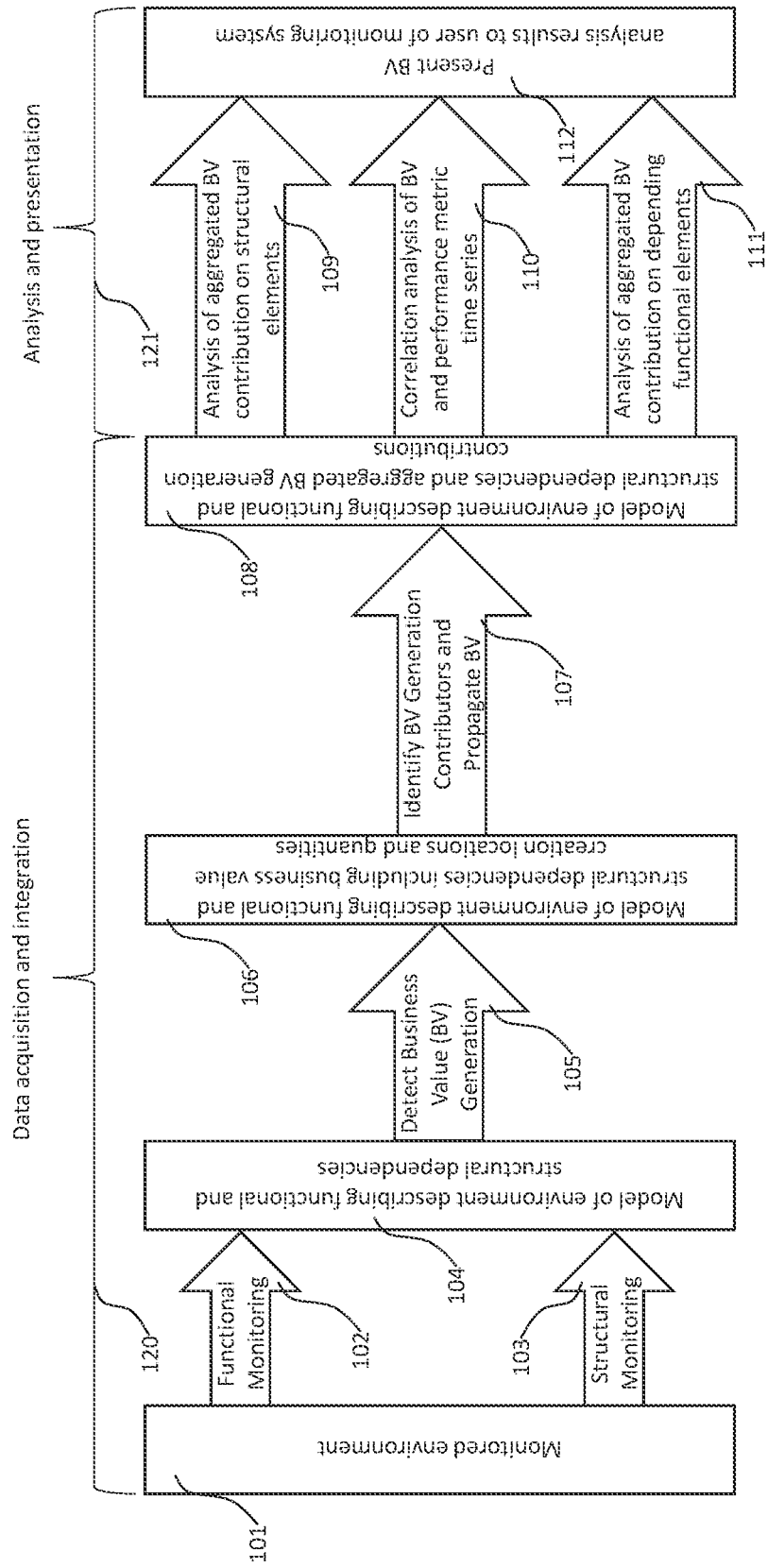

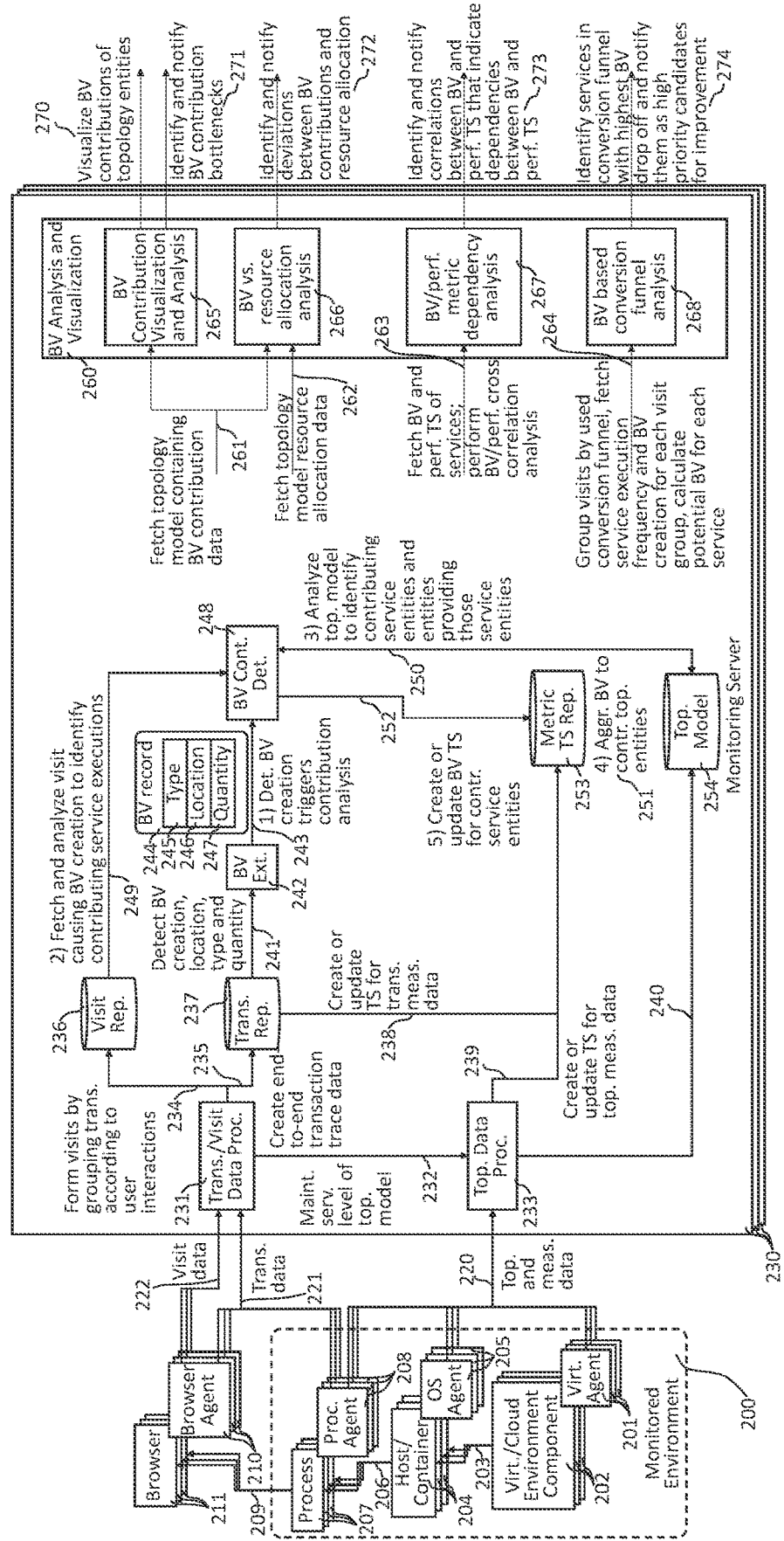

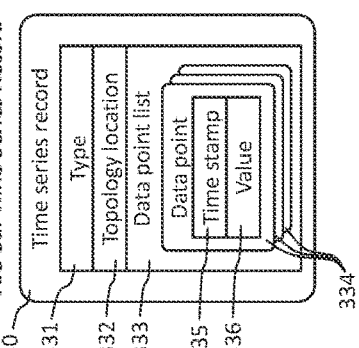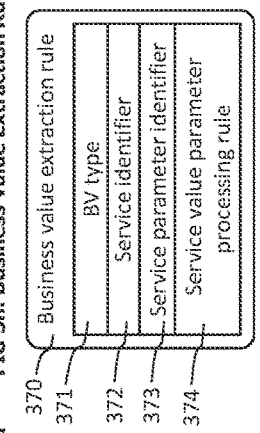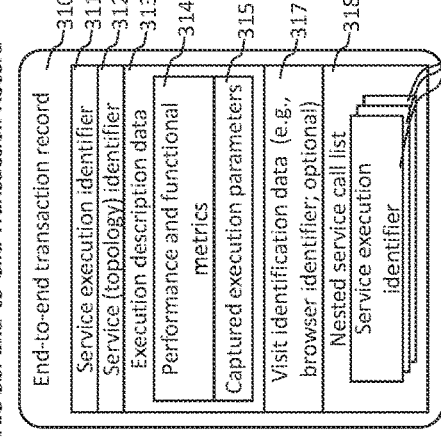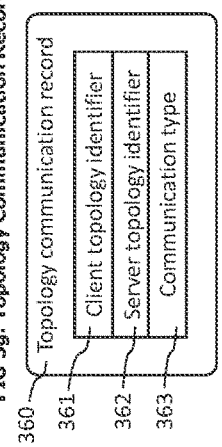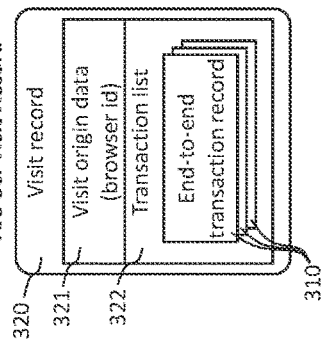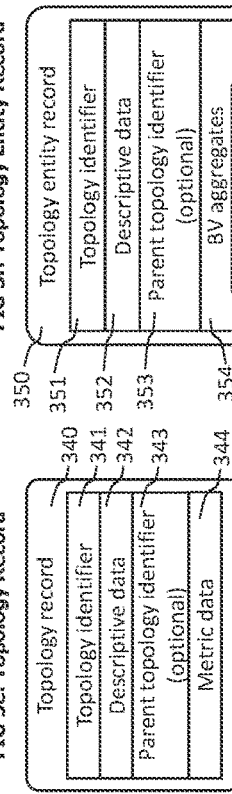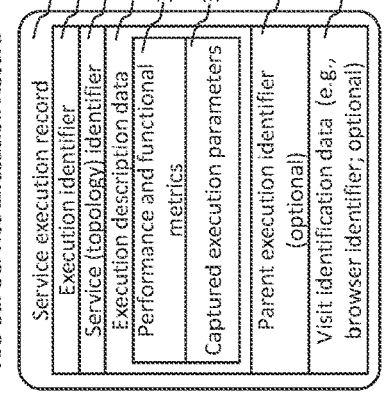

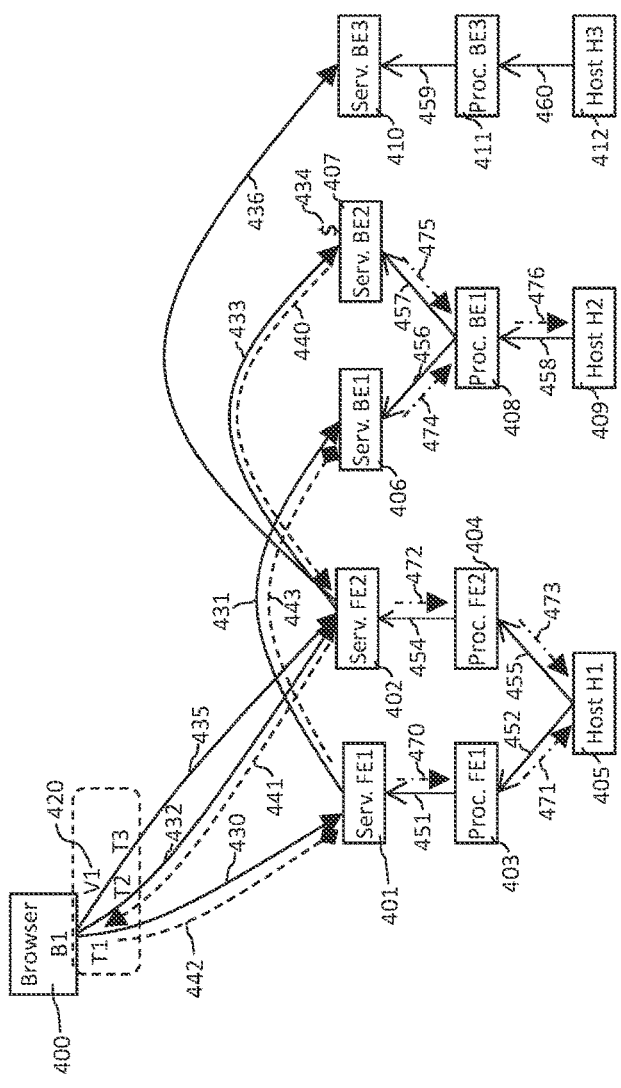
FIG 4: Business Value Propagation Example

Processing of Received Monitoring Data

FIG 5a: Processing of Service Execution Records

500 — Service execution record received from process agent

501 — Create or update corresponding end-to-end transaction record

502 — Extract metric data from service execution record and create or update corresponding TS records (FIG. 5c)

503 — Extract service identity, location and dependency data from received service execution record and update topology model accordingly

 504

FIG 5b: Visit Record Creation

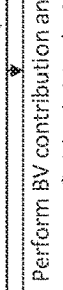

510 — Either triggered by finished end-to-end transaction, or cyclically

511 — Select end-to-end transactions that are not yet assigned to a visit, group selected end-to-end transactions by transaction origin (e.g., browser instance)

512 — In each group of transactions with same origin, identify transaction sequences, where the time between two consecutive transactions is below a certain threshold 513 — Create or update visit record for each identified transaction sequence 514 — Perform BV contribution analysis for new finished visits (FIG. 6a)

 515

FIG 5c: Metric Data Processing

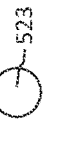

520 — Metric data including metric type, value, time stamp and location received 521 — Fetch time series record with matching metric type and location from metric time series repository; create new time series record for metric type and location if none is available 522 — Create data point entry using received time stamp and value and append it to the data point list of the fetched or created time series record

 523

FIG 5d: Topology Data Processing

530 — Topology record received

531 — Update topology model accordingly

532 — Extract metric data from topology record and create or update corresponding TS records (FIG. 5c)

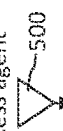 533

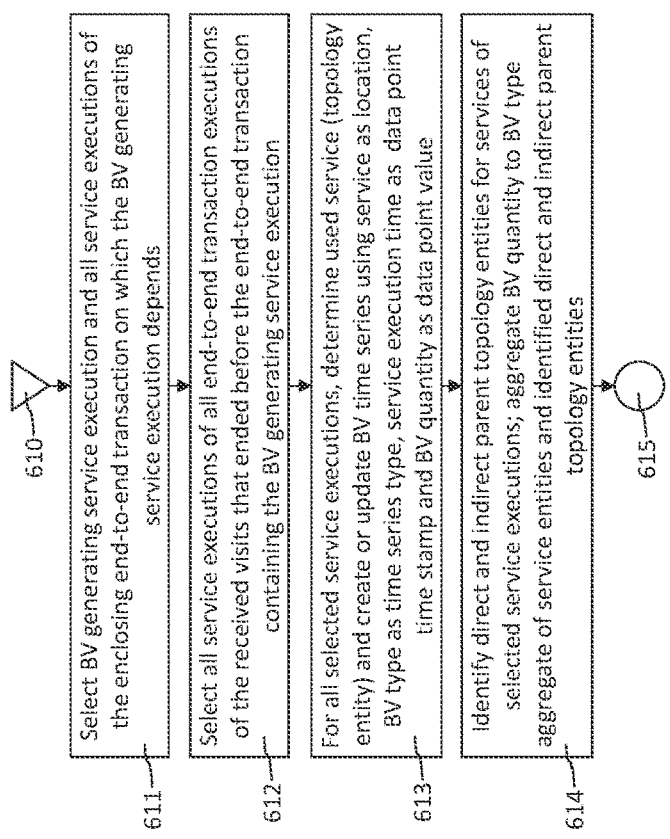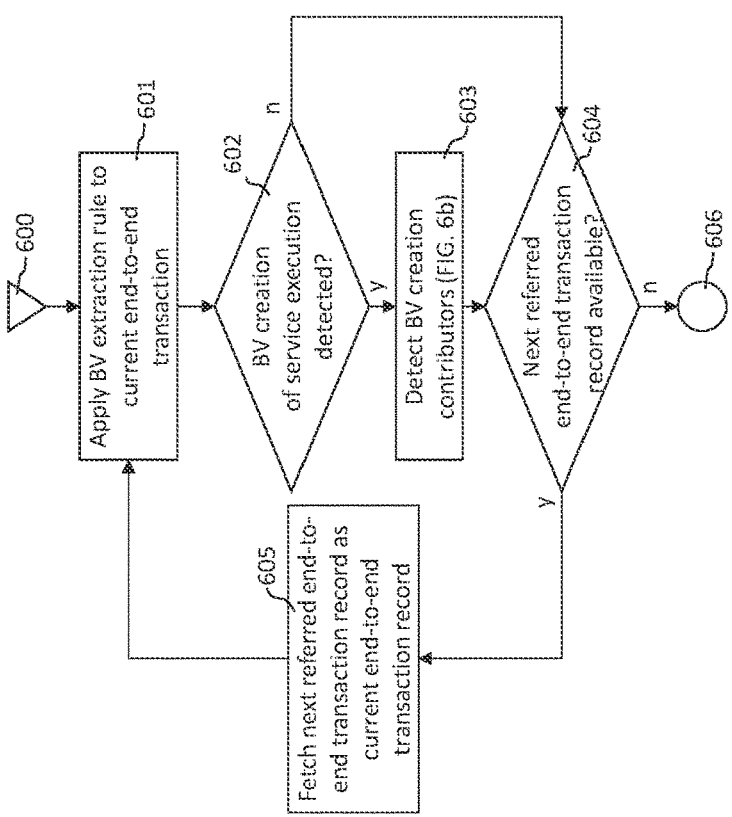

Exemplary Analyses of Business Value Contribution Data Related to Topology Structure

FIG 7a: BV Heat Map Presentation

Receive request to display heat BV heat map of topology for specific BV type, for a specific time period

- 700
- 701 — For each topology entity, calculate BV quantity of received BV type for received time period
- 702 — Mark visualization of topology entity according to calculated BV quantity (e.g., by color coding)
- 703

FIG 7b: BV Contribution vs. Resource Allocation Analysis

Receive request to analyze BV contribution vs. resource analysis for a specific resource type (amount of main/secondary memory, CPU units, rental/purchase costs) and a specific BV type

- 710
- 711 — Calculate relative BV contribution for each topology entity
- 712 — Calculate relative resource allocation for each topology entity
- 713 — Identify and report topology entities for which relative resource allocation is significantly higher than relative BV contribution
- 714

FIG 7c: Identification of Bottlenecks in BV Contribution

Receive request to identify topology entities with a number of equivalent entities that is below a certain size threshold and with a relative BV contribution for a specific BV type that is above a certain BV threshold

- 720
- 721 — Identify groups of equivalent topology entities; select groups with size below threshold
- 722 — Calculate relative BV contribution for selected groups
- 723 — Report selected entity groups with relative BV contribution above threshold as BV bottlenecks
- 724

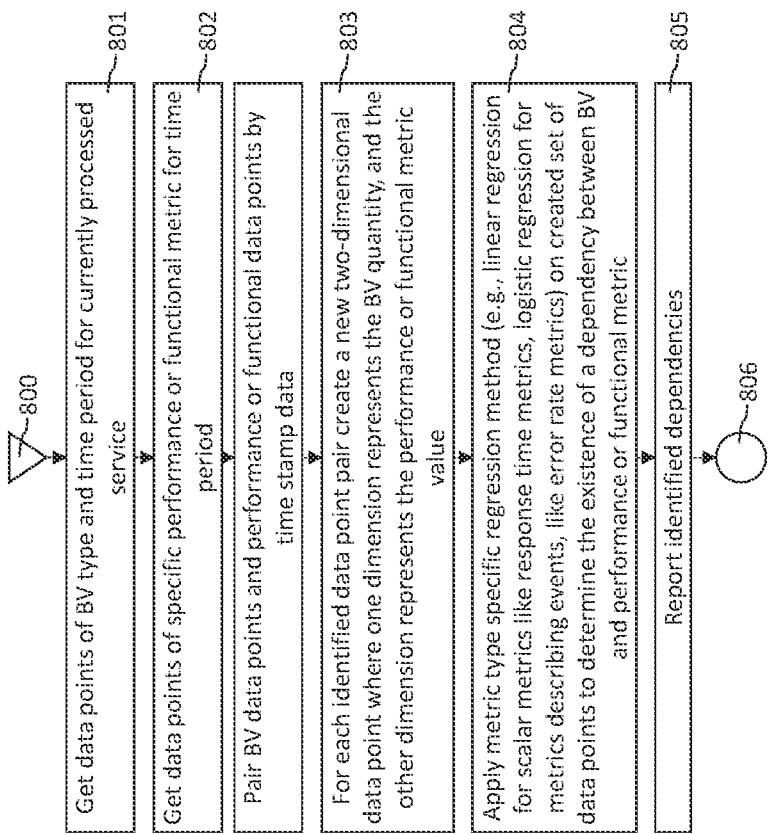

FIG 8: Identification of Dependencies between Performance or Functional Metrics and Business Value Contribution Metrics For each service in topology, for a specific BV type, a specific performance or functional metric type and a specific time period — 800

801 — Get data points of BV type and time period for currently processed service 802 — Get data points of specific performance or functional metric for time period 803 — Pair BV data points and performance or functional data points by time stamp data 804 — For each identified data point pair create a new two-dimensional data point where one dimension represents the BV quantity, and the other dimension represents the performance or functional metric value 805 — Apply metric type specific regression method (e.g., linear regression for scalar metrics like response time metrics, logistic regression for metrics describing events, like error rate metrics) on created set of data points to determine the existence of a dependency between BV and performance or functional metric Report identified dependencies

806

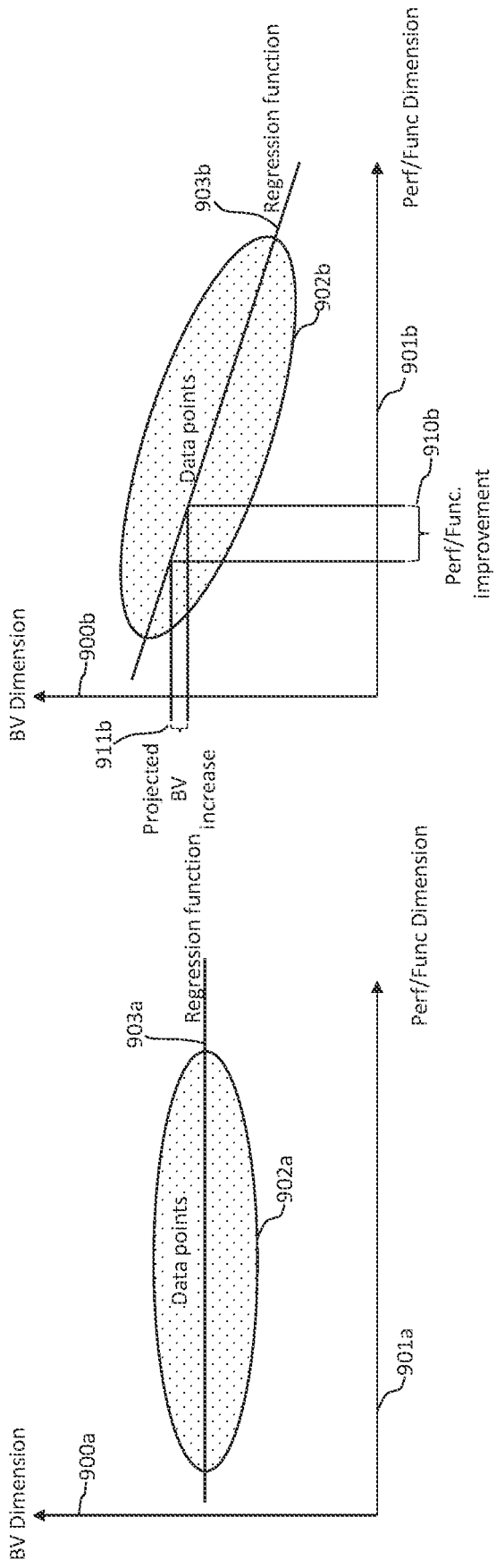

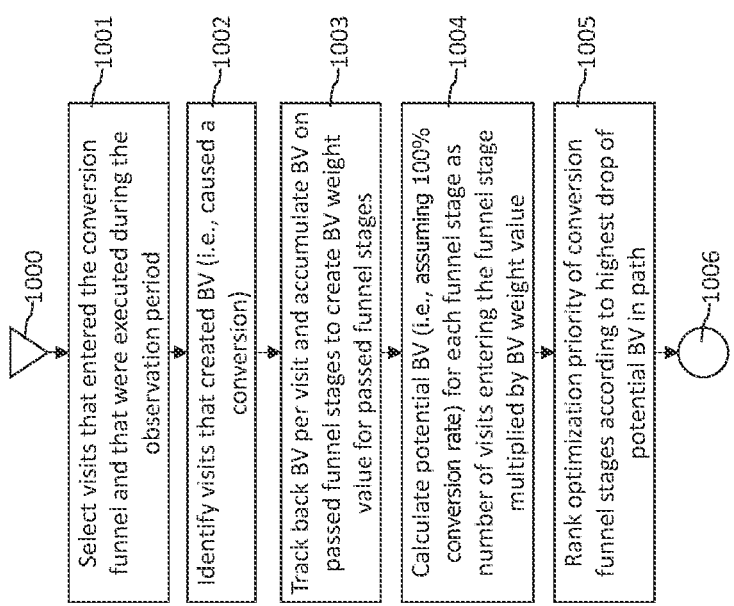
FIG 10: BV Based Conversion Funnel Analysis

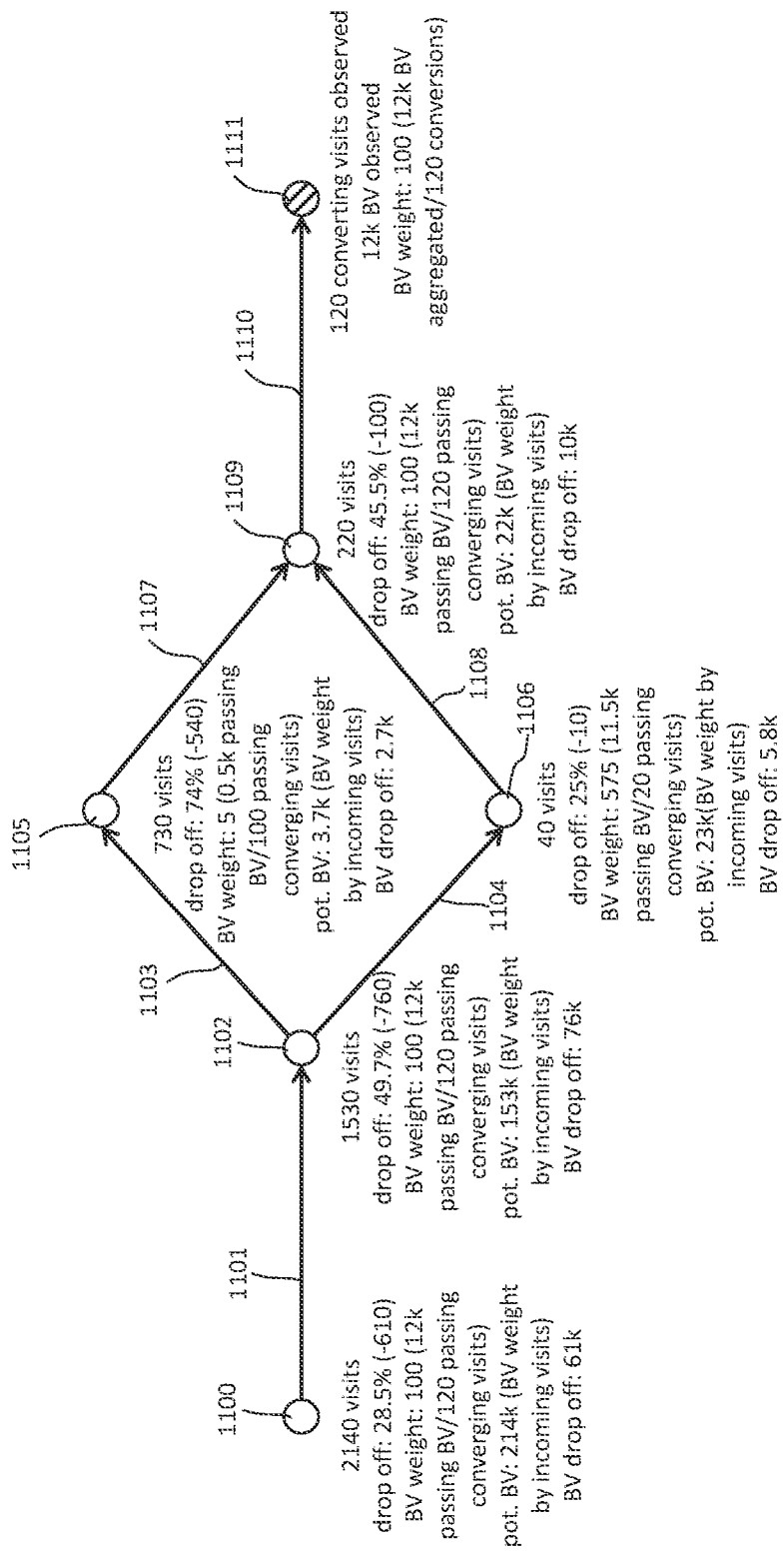

OPTIMIZING CLOUD-BASED IT-SYSTEMS TOWARDS BUSINESS OBJECTIVES: AUTOMATIC TOPOLOGY-BASED ANALYSIS TO DETERMINE IMPACT OF IT-SYSTEMS ON BUSINESS METRICS

CROSS-REFERENCE TO RELATED APPLICATIONS

This application claims the benefit of U.S. Provisional Application No. 63/145,012, filed on Feb. 3, 2021. The entire disclosure of the above application is incorporated herein by reference.

FIELD

The present disclosure generally relates to the estimation of business value contributions for components of a computing environment and more specifically to monitor individual business relevant activities in a transaction context and to use back-tracking mechanisms on transaction related monitoring data to identify transaction activities and components that were prerequisites of generated business values.

BACKGROUND

Modern application performance and monitoring tools provide deep insights into performance and functionality of individual components of monitored applications and may even provide tracing data describing the execution of individual transactions. Acquired monitoring data also reveals structural and functional dependencies of application components that may be used to identify causal dependencies between multiple observed conditions, which may in turn be used to identify appropriate targets for counter measures for observed performance degradations or other types of malfunctions. The gathered monitoring data is currently mainly used to quickly identify and fix performance or functionality issues.

Monitoring data describing economical value generated by applications, like e.g., the economic value of goods sold by an executed transaction, amount of advertisement placed during an interaction with a monitored application or the increase of the user base of an application may also be acquired by those monitoring systems. Like performance/functionality related monitoring data, this economically relevant monitoring data is used in a reactive fashion by e.g., identifying and reporting unexpected drops of economic key data, thereby relying on human interaction to apply appropriate counter measures.

Although the gathered monitoring data is of great help to identify and fix undesired performance/functionality- or business-related conditions, it is currently not usable for proactive measures, like e.g., allocating processing and other resources to those components of an application that are most relevant for the creation of business relevant outcome, like e.g., the generation of sales.

Current monitoring systems are capable to report details about the occurrence of certain business relevant events, like the purchase of a product, e.g., in form of the execution of a specific function by a specific component which indicates such a purchase activity, the time at which the activity occurred, and a value quantifying the activity, like e.g., the value of the purchased goods. However, those monitoring systems fail to identify other components that were also involved in the execution of the business relevant activity, like sequences of other activities that directed an application user to a location where a business relevant activity can be performed. Consequently, those monitoring systems also fail to quantify the contribution of those other activities, and the components used to perform those other activities, that represent prerequisites for the business value generation.

Automatically generated data that describes the contribution of individual components to the generation of business relevant values would be a helpful input to proactively optimize application deployments and architectures towards business needs. As an example, components with no or negligible contributions to business value generation may be identified and resources allocated to those components may be reduced. Components with high business value contributions may be identified, and additional resources may be allocated to those components e.g., to improve their failure resilience.

Consequently, there is need in the field to automatically quantify the business relevance of individual components of monitored applications.

This section provides background information related to the present disclosure which is not necessarily prior art.

SUMMARY

This section provides a general summary of the disclosure, and is not a comprehensive disclosure of its full scope or all of its features.

Agents are deployed to components of a monitored environment, like processes executing transactions, to host computing systems on which those processes run and to web-browser applications which are executed by end-users that interact with applications executed in the monitored environment.

Together, those agents provide transaction monitoring data describing individual, distributed transactions that may span multiple process, potentially executing on different host computing systems. The gathered transaction monitoring data also describes communication activities between involved processes, e.g., in form of calls performed by sender processes to request a service execution that are received by remotely located receiver processes that provide the requested services. This service call monitoring is used to incrementally create a service topology model describing the services that are available in a monitored environment, together with call dependencies between those services. Structural monitoring data gathered by those agents, describing e.g., services provided by processes, processes running on host computing systems or containers and virtualization components providing virtualized host computing systems, are used to generate a structural topology model of the monitored environment and to tie the structural topology model with the service topology model. It should be noted that the term "transaction" is used herein to describe a computer transaction that e.g., involves the execution of code by processes, the interaction of processes via a computing network by calling services. It does not include financial transactions. Some of those computer transactions may also trigger business relevant activities, like the purchase of goods or services. Those business relevant activities may cause the execution of commercial transactions.

Agents executing in web-browsers of end-users provide transaction monitoring data that identify the origin of individual monitored transactions. Origin data and timing data may be used to identify transaction sequences with the same origin that are also temporally related. Those transaction sequences represent individual interactions of specific users with the monitored application and describe how users navigate through the application. Such identified transaction sequences may also be referred to as visits.

Transaction data captured by the deployed agents may in addition contain data indicative for performed activities that create business relevant values. This data may contain data describing and identifying the execution of a method or a service that corresponds to the creation of business-related values, like the execution of a method or a service that registers a performed purchase with the monitored application. This business-related trace data may in addition contain data that quantifies the generated business relevant value, like e.g., a purchase amount. Agents may instrument existing application functionality using known techniques like byte-code instrumentation at runtime to gather transaction trace data, including business relevant data.

The business-related transaction data captured by the agents describes time, location and quantity or weight of an observed business-related activity. Transaction trace data also described other activities performed by a transaction containing a business relevant activity, including temporal sequence and call dependencies of those other activities a business-related activity. As an example, transaction trace data may indicate that a transaction first called a service "A" and then a service "B", which describes the temporal sequence of first calling service "A" and then service "B". The execution of service "B" may call service "C", represents a call dependency from service "B" to service "C". Transaction activity, including call sequence and call dependency data may also be recorded on a method level. As an example, execution of service "A" may include execution of method "X" before method "Y" and method "X" may call method "Z". Transaction trace data may also describe the execution of those methods, their temporal sequence (method "X" is executed before method "Y") and their call dependencies (method "X" calls method "Z").

Recorded temporal sequence and call dependency data may be used to identify transaction activities that were executed or started before a business relevant activity, and those activities may be considered as prerequisites for the business relevant activities. Returning to previous example, service "C" may be identified as performing a business relevant activity. Therefore, service "B" may be considered as prerequisite for "C" because service "C" was called by service "B" and service "A" may be considered as prerequisite of "C" because it was called by the transaction before service "C". Transaction trace data may be traced backwards, by following call dependencies and temporal sequences starting from the observed business-related activity in reverse order to identify all activities that led to the business-relevant activity. Components involved in the execution of those prerequisite activities, like e.g., services called by the transactions prior to the business-related activity may be identified and marked as contributors to the generated business relevant value. Some variant embodiments may, on an observed business relevant activity by a transaction, consider all other activities that were in addition performed by the transaction as contributors to the generated business relevant value, regardless of the activity being performed before or after the business value generation.

Further, reported structural dependency data, like data describing which services are provided by which processes, which processes execute on which host computing system and which virtualization components provide virtual host computing systems are used to identify components that are also involved in the creation of business relevant values. As an example, for a given service that was identified as contributor to creation of business value, the process providing the service and the host computing system executing the process may be identified as contributors to the business value creation. In case the process runs in a container provided by a container management system running on a host computing system, also the container and the container management system may be selected as business value contributors. If the host computing system is virtualized, also virtualization components providing the virtualized host computing system may be considered as contributors.

Identified transaction sequences of visits may in addition be used to identify business value contributors. As the transaction sequences of identified visits represent the path by which a user navigated through an application, all transactions of a visit that were executed before a transaction of the visit that performed a business-relevant activity may also be considered as prerequisites to the generated business value. All services used by those transactions, and all other components on which those services depend (i.e., processes providing the services, hosts/containers executing those processes etc.) may be identified as contributors to the business value generation. Some embodiments may select all transactions of a visit which led to the generation of a business value as contributors, regardless of their execution occurred before or after the transaction in which the business value generating activity was performed.

The so identified contributing components are then annotated as contributors to the observed business value generating activity. Some variant embodiments may maintain aggregate values for contributing components. Those variants may e.g., for an observed business value generation, determine a quantity of the generated value, maintain a counter for the business value quantity in each contributing component and increment this counter by the determined business value quantity on each identified contributing component.

Alternative embodiments may instead, or in addition, maintain corresponding time series for each identified contributing component. Such time series may contain identification data that identifies the contributing component for which it stores business value time series data. Measurement data of those time series may consist of data points, where each data point records the quantity of an observed business value generation and the point in time when the observed business value generation occurred.

Some embodiments may perform visualization and analysis tasks on the generated business value contribution data. A first exemplary application of the gathered business value contribution data is to visualize the degree that individual components contribute to the creation of business value in a visual representation of the topology model of the monitored application. As an example, the aggregated business value contribution of individual topology components may be used to color-code those components in a business value related visualization, to make components corresponding to large amounts of business value generation easily identifiable. Variant visualizations may in addition consider resources assigned to different topology components, like overall cost of those components, compare resources consumed by those components with their business value contributions to e.g., identify and highlight those components for which the costs of used resources exceeds the financial value of their business value contribution.

Variant embodiments may in addition identify components of the monitored application that represent a bottleneck for transaction traffic that travels through a monitoring application and that are also major contributors to business value contributions. Such identified critical components may be presented to a user of the monitoring system and further analyses may be performed to evaluate the loss of business value that the application suffers when such a bottle neck component fails.

Other embodiments may instead or in addition perform a co-analysis of business value contribution and other, performance or functionality related time series data for individual components, like services, to identify dependencies between an amount of generated business value and another performance/functionality metric. More specifically, such embodiments may, for each observed business value contribution observed for a specific service, fetch a corresponding performance or functional metric value (i.e. by fetching the value of the performance or functional metric at the point in time when the business value generation was performed) and create a set of two-dimensional data points, where one dimension represents the business value contribution and the other dimension represents the value of the selected performance or functional metric. Various regression analyses may be performed on the so created data set to determine whether a change of the performance or functional metric also changes the amount of generated business value.

Still other embodiments may analyze the so calculated business value contribution weights to analyze the effectiveness of conversion funnels based on business value contribution data instead of only considering transaction frequency data. A conversion funnel represents a navigation path provided by an application that guides application users from frequently used application functionality, like entry pages, search functionality or the like, to application functionality where business relevant activities, like the purchase of goods or services, can be performed. Conversion funnels may contain multiple navigation steps, and the effectiveness of those navigation steps may be measured in terms of users that reached a given funnel step compared to the users that navigate to the next navigation step of the funnel. In conventional monitoring system such effectiveness analyses may be based solely on usage/navigation frequencies for different funnel steps. In a monitoring system that detects and quantifies the creation of business-related values and uses back propagation mechanisms to assign created business value also to other activities or components that contributed to the creation of business values, business value weights may be used in addition to navigation frequencies of conversion funnel components for a more precise calculation of their effectiveness.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 provides a conceptual overview of the flow of captured monitoring data, the detection of business value generating activities in monitoring data, the identification of components and functionality that contributed to observed business value generation and exemplary downstream analyses.

FIG. 2 shows a block diagram of a monitoring system according consisting of agents deployed to a monitored environment and providing transaction trace and topology monitoring data, transaction and topology processing modules that create end-to-end transactions and a topology model from received monitoring data, a module to detect, localize and quantize business related activities, a module to identify additional functionality and components that contributed to the business value generating activity and that assigns business value weights to identified contributors, and some exemplary modules that perform analyses on determined business value weights.

FIGS. 3a-3h provide data structures that may be used to store transaction and topology related monitoring data and data structures that may be used to store business value extraction rules that may be used to analyze transaction trace data to identify business value generating activities in transaction trace data, to extract a quantity value for identified business value generating activities and to localize identified business value generating activities in a topological model of a computing environment on which a monitored transaction was executed.

FIG. 4 shows an exemplary scenario of a set of transactions forming a visit, and the components on which those transactions are executed. The identification of business value generating activity and the usage of transaction related and structural dependencies to identify contributors to the observed business value generating activity are shown by this example.

FIGS. 5a-5d provide flow charts of the processing of transaction and topology related monitoring data by a monitoring server.

FIGS. 6a-6b shows flow charts of processes to identify, locate and quantify business value generation activities in transactions and to identify additional components and functionality that are prerequisite for the business value generation.

FIGS. 7a-7c describe exemplary analyses of business value contribution data of topology components.

FIG. 8 provides a flow chart of a process for the identification of dependencies between metric data describing performance or functional aspects of components of a monitored environment, like services provided by processes and used to execute transactions, and metric data describing the amount of generated business value.

FIGS. 9a-9b conceptually describe two scenarios of combined performance and business value measurement data sets, a first scenario indicating no functional dependency between performance or functional metric data and business value related metric data and a second scenario in which a functional dependency between performance or functional behavior and generated revenue can be derived from metric data which indicates that an improvement of performance/functional behavior also leads to increased business value generation.

FIG. 10 describes a process to determine the efficiency of conversion funnels of web application based on business value contribution weights instead of transaction frequencies.

FIG. 11 visually describes the evaluation of an exemplary conversion funnel using business value contribution weights.

Corresponding reference numerals indicate corresponding parts throughout the several views of the drawings.

DETAILED DESCRIPTION

Example embodiments will now be described more fully with reference to the accompanying drawings.

The disclosed technologies aim to integrate performance or functionality related monitoring data with business-related monitoring data and to quantify the contribution of individual components of a computing environment, like host computing system or processes, to the generation of business relevant outcome, like revenue.

Agents are deployed to monitored environments to monitor and report components existing in the monitored environment together with data describing their structural dependencies and basic communication activities. The so gathered data is used to incrementally create a topological model of an observed environment that describes its components, their structural dependencies (i.e., process components running on computing system components, virtualized computing system components provided by virtualization components and their basic communication activities, like processes exchanging data using fundamental network functionalities like TCP or UDP communication).

In addition, those agents also monitor transactions executed on those environments and report them in form of transaction traces. The transaction traces may, next to data identifying and describing services and methods executed by the traced transactions, also contain data describing the execution context of different portions of those transactions, e.g., in form of names, types and values of parameters that are used to execute individual services or methods by individual transaction.

Gathered execution context data may be used to identify events or activities that represent the generation of business relevant values, like e.g., names of methods or services that indicate e.g., the registration of a purchase or other financial transaction that has an economic impact. Gathered parameter values may be used determine a value that quantifies the economic value of the observed activity, like a purchasing price.

As transaction trace data also contains data describing the location of observed activities, the detected business-related activities can be localized in the monitored environment in which a corresponding transaction was performed.

The transaction trace data describes portions of monitored transaction activity and data describing temporal or call dependency based relationships of those activities. This relationship data may be used to identify activities of monitored transaction executions that led to observed business relevant activities.

Those transaction activities and also components used to execute those activities, like e.g., services provided by processes and used by the transaction to perform those activities, may be considered as contributors to the business value generation.

The term "service" is used herein to describe interfaces of computing components, like processes which are capable to receive requests from other, potentially remote computing components. Examples for provided services are HTTP request handling services, remote method invocation services or data base request (i.e., SQL query request) handling services. Transaction trace data may contain data describing both sending and receiving a service request, in case both sender and receiver component (i.e., process) are instrumented with an agent. In case only sender or receiver are instrumented with an agent, the transaction trace data may only contain data describing sending a service request when the sender component is instrumented or only contain data describing the receipt of the service request if only the receiver is instrumented. In all those cases, topology data is enriched with topology entities describing the service, and the topology entity describing the service is related to the topology entity (i.e., process) providing the service to model the location of the service.

Transaction trace data describes the execution of such services, and for service executions which were identified as contributors to the generation of business value, the topology entities used for the reported service executions, like service entities or entities representing processes providing those services, may be fetched from a topology model and the generated business value may be assigned to those service entities. Incrementally assigning business value contribution data to contributing service entities for each observed transaction that generated business value creates monitoring data describing the overall contribution of individual services to the generation of business value. The assigning of observed business value generation to contributing services may be performed by maintaining an aggregate counter for each type of business value that is incremented with each observed contribution by the amount of generated business values. Alternatively, time series data may be maintained for each service and for each business value type. Conceptually, such time series record for each observed business value contribution of a specific type, the time when the contribution occurred, the topological location of the contribution, and the amount of generated business value.

After service entities that were involved in the generation of business value were identified and the contribution of those service entities to the business value generation was recorded, entities on which those services depend may be identified. Those entities include the processes providing a contributing service, host computing systems running such a process and virtualization components that provide a virtualized computing system on which a process providing a contributing service is executed. Topology data describing entities of the monitored environment and their structural dependencies may be used to identify those entities. Contribution data may be recorded for those entities in form of aggregating counters and/or time series data as already described.

Monitoring systems may also detect transactions that were issued from the same origin, e.g., a specific instance of a web browser, for web-based transactions and use this origin data, together with timing data of observed transactions to identify sequences of transactions that represent a separate interaction of a user with a monitored application. Agent operating in web browser executed by users to interact with the application may provide this origin data.

If a transaction contained in such a transaction sequence or visits performs business-relevant activities, then also other transactions in the visit that led to this transaction may be considered as contributing to the business value generation. Services executed by those transactions and components on which those services directly or indirectly depend may be identified as described above and generated business value may also be recorded for them.

Coming now to FIG. 1, which conceptually describes the data flow of a monitoring system that also identifies the contribution of components of a computing environment to the generation of business-relevant values.

A first portion of the data flow is dedicated to the acquisition and integration 120 of transaction trace and topology monitoring data, the identification and localization of business value generation activities, the identification of contributing components and recording of business value contribution for those identified components.

A second portion of the data flow is directed to various forms of analyses and visualizations 121 of the gathered business value contribution data.

Monitoring entities, like e.g., agents are deployed to a monitored environment 101 and provide structural monitoring data 103 which describes the monitoring environment and functional monitoring data 102 describing the activities performed by the monitored environment.

Provided monitoring data 101 and 102 are used to create a model of the monitored environment that describes its components or entities and the structural and functional dependencies of those entities. Structural dependencies may e.g., describe which processes are executed by operating systems, whether those processes are executed directly by the operating system or in a container that isolates those processes from other processes running on the operating system. Functional dependencies may describe call dependencies, like nested service or function calls and temporal dependencies like the sequence of functions or services provided by various processes that are called by monitored transactions to generated requested results.

The so generated model of the monitored environment is analyzed to identify activities that correspond to the generation of business relevant values 105, like e.g., the generation of revenue caused by the execution of a transaction.

The result of this analysis is a model of the monitored environment 106 that also contains data describing the location where business relevant values were created and data describing the quantity of the generated business value.

A further contributor identification analysis 107 is performed on the model of the monitored environment to identify the contributors to the observed generation of business relevant values. This analysis may start with the observed business value generation event and first analyzes its transactional context to identify the activities that led to the generation of business value. This may include identifying those activities of the transaction containing the business value generating activity that were performed by the transaction before the business value generating activities. The so identified activities may be considered as activities contributing to the observed business value generation. This analysis may also consider an inter-transactional context, like other transactions that led to the business value generating transaction. Monitoring systems may track and report data identifying the origin of individual transactions, like an individual web browser. This origin data, together with transaction timing data may be used to identify sequences of transactions that represent individual interactions of specific users that represent the navigation path of those users through a monitored application. Transaction executions contained in such a navigation path (or visit) that were executed before a transaction that generated a business value may also be considered as transactions that contributed to the business value generation. After contributing activities, like executions of services were identified, the components of the monitored environment that provide those services and on which those services directly or indirectly depend are identified. Those components may be processes providing contributing services and containers or operating systems executing those processes. Structural dependencies observed by agents may be used to generate a topological model of a monitored application describing detected components and their dependencies. This topological model may be used to identify those contributing components.

After contributing activities and components were identified, the quantity of generated business value is assigned to those activities and components, either in form of aggregated sums of generated business value per activity/component, or in form of time series data describing for each contributing activity/component amount, time, and location of a detected business value contributions.

The data acquisition and integration process 120 may continuously performed for each observed transaction that generated business relevant value and so generate a model of the monitored environment 108 that contains business value contribution data for a longer time frame.

The subsequent analysis and presentation activities 121 may only be performed after a specific amount of monitoring data including observed business value generation activities is available that can be used for reliable statistical analyses.

Exemplary analysis and visualization tasks may contain an analysis 109 of aggregated business value contribution of structural elements of the monitored environment, like processes or host computing system. The result of this analysis may be presented 112 to a user of the monitoring system in form of a "business value heat map" of the monitored environment, which e.g., highlights those components that are responsible for a large portion of generated business value.

Another analysis task may correlate 110 business value contribution time series data and other, performance or functionality related time series data to derive functional dependencies between performance or functionality of a specific components and its contribution to the generation of business value. Identified dependencies may be presented 112 to a user of the monitoring system in form of suggestions like "improving the performance of component X by 5% may increase revenue by approximately 2%".

Further, components of the monitored environment that are designed to direct an end-user of the monitored environment to perform business relevant activities, like elements of a conversion funnel, may be analyzed 111 using the generated business value contribution data. The trajectories of multiple end-users through the components of a conversion funnel may be observed and business value contribution data of the conversion funnel components may be used to estimate the business value that was lost due to end-users that dropped out at a specific component of the conversion funnel. The so calculated "potential business value" for each stage of the conversion funnel may the presented 112 to a user of the monitoring system to evaluate the priority of different paths of a conversion funnel based on revenue/business value data instead of transaction frequency data.

Coming now to FIG. 2, which provides a block diagram of a monitoring system that provides business value contribution data based on observed business value generating activities and identified functional and structural dependencies.

A monitored environment 200, either in form of a physical data center, or in form of a cloud computing setup, operates various components, like virtualization or cloud infrastructure components 202 that provide 203 virtualized host computing systems 204. The monitored environment may in addition contain also physical, not virtualized host computing systems. The physical or virtual host computing systems may in turn execute container management systems to provide isolated execution environments in form of containers 204. Processes 207 may be executed 206, either directly by operating systems running on those hosts, or in containers provided by container management systems running on those operating systems.

External software components like web-browsers 211, may be operated and used by end users of applications provided by the monitored environment to interact 209 with processes 207 that provide functionality of those applications.

Agents 201, 205, 208 and 210 are monitoring to those components and provide various types of monitoring data describing the structure of the monitored environment and also activities performed in the monitored environment, like the execution of transactions.

Virtualization agents 201 are deployed to the monitored environment and monitor virtualization and cloud environment components 202. Those virtualization agents generate topology and measurement data 220 describing the virtualization/cloud components, their resource provision and consumption, their configuration and structural dependencies between virtualization/cloud components and other components. Those structural dependencies may e.g., describe the virtualized host computing systems that are provided by specific virtualization components like e.g., hypervisor components.

Operating system agents (OS agents) may monitor host computing systems (physical or virtualized) and containers provided by those host computing systems. Those OS agents also provide topology and measurement data 220 describing existence, configuration and resource provision and consumption of monitoring host computing systems and containers. The created monitoring data may e.g., describe capacities of host computing systems, including amount of main memory, number and performance of CPUs, available network bandwidth, resources granted to and used by individual containers or processes, and structural dependency data describing which container or process is executed on which host computing system.

Process agents 208 monitor processes 207 executing in the monitored environment and provide both topology and measurement data 220 and transaction data 221. Topology and measurement data provided by process agents may contain data describing and identifying individual processes, their resource consumption and structural dependency data describing e.g., which container or host computing system executes a monitored process.

Transaction data 221 provided by a process agent deployed to a monitored process describes individual computing or communication activities performed by the monitored process, together with correlation data that identifies activities performed by other processes (including processes executing web-browsers 211 operated outside the monitored environment) that caused or were caused by the described individual activities. Transaction trace data provided by different process agents deployed to different processes may be used to create end-to-end transaction trace data describing distributed computer transactions that involved activities of different processes potentially executing on different host computing systems.

Browser agents 210 may be operating in web-browsers 211 of end-users of applications or functionality provided by the monitored environment. Both web-browsers and browser agents may execute outside the monitored environment. The browser agents may monitor activities performed on web-browsers and create transaction trace data 221 describing those activities. The created transaction trace data may also contain correlation data that identifies activities performed by processes in the monitored environment that is caused by monitored browser side activities. Transaction trace data from process agents 208 and browser agents 210 may be combined to create end-to-end transaction trace data that both describes web-browser side activities and the activities observed in the monitored environment that were caused by monitored activities on the web-browsers.

Browser agents 210 may also create and provide visit data 222, which identifies the web-browser instances on which specific activities were observed. The visit data 222 may be used to group end-to-end transaction data according to the web-browser instance on which the transactions were triggered. As a web-browser instance is typically operated by one specific end-user user, this web-browser based grouping of transactions is also a good approximation for a per end-user grouping. Visit data 222 may be used in combination with transaction timing data to form sequences of transactions that describe individual trajectories of end-users through applications provided by the monitored environment. Those sequences may also be referred to as visits.

Topology and measurement data 220, transaction trace data 221 and visit data 222 may be sent from the agents creating those data to a monitoring server 230 using one or more connecting computer networks (not shown). In some variant embodiments, multiple monitoring servers may be configured to form a monitoring server cluster to increase monitoring data ingest and processing capacities of the monitoring system.

Transaction data 221 and visit data 222 are received by a transaction/visit data processing module 231 of the monitoring server. Received transaction data is used to incrementally create end-to-end transaction trace data including trace data describing web-browser side activity and back-end activity monitored on components of the monitored environment 200 that were caused by web-browser side activities. Finished end-to-end transaction traces are stored 235 in a transaction repository for further storage, visualization, and analysis. Received visit data 222 may be used by the transaction and visit data processor to separate end-to-end transaction traces by their initiating browser-instance (i.e., the web-browser instance on which the activity that triggered a monitored transaction was observed). Transactions originated from the same browser instance may then be further segregated according to transaction timing data, to e.g., form sequences of transactions that originate from the same browser instance and for which the time between two consecutive transactions does not exceed a specific threshold. So identified transaction sequences are fetched 234 and added to a visit record (see FIG. 3c), which is then stored in a visit repository 236 for further analysis and visualization.

Creation of end-to-end transaction trace data and visits may be performed according to the teachings of U.S. Pat. No. 9,571,591 "Method and system for tracing end-to-end transaction which accounts for content update requests" by B. Greifeneder et. al., which is included herein in its entirety by reference.

The transaction/visit data processor may also analyze transaction trace data to extract data identifying services used by monitored transactions, the processes providing those services and call dependencies between those services. The gathered service data may be forwarded 232 to a topology data processor to create and maintain a service level of the topology model. Services may be represented as topology entities in the topology model. The topology data processor may use the received service data to create service entities in the topology entities, create topology connections representing service call dependencies and topology connections connecting service entities with process entities providing those services. Entities representing processes may be connected with service entities representing the services provided by those processes using a type of topological connection that indicates a structural dependency.

Services entities of services having a call dependency may be connected using a type of topological connection that indicates a directed communication from a calling service to a called service.

End-to-end transactions stored in the transaction repository 237 may also be analyzed to identify service executions and to extract performance and functionality measurement data, like service response time or service error rate data for individual service executions. The extracted measurement data may further be used to create or update 238 time series data for the services for which executions were observed.

The created or updated transaction-based time series may be stored in a metric time series repository 253.

The topology data processor 233 receives topology data 220 from agents that describe the components of a monitored environment and their structural dependencies. The topology data processor incrementally creates a topology model 254 of the monitored environment using the topology data received from agents and the service topology data received 232 from the transaction/visit data processor 231.

Acquisition of topology data by various agents and generation of a topology model out of topology and transaction trace data may be performed according to the teachings of U.S. Pat. No. 11,159,599 "Method And System For Real-Time Modeling Of Communication, Virtualization And Transaction Execution Related Topological Aspects Of Monitored Software Applications And Hardware Entities" by B. Greifeneder et. al., which is included herein in its entirety by reference.

A business value data extraction module 242 continuously analyses transaction trace data in the transaction repository 237 to identify activities that represent the generation of business relevant values.

Transaction trace data may contain data identifying the services that were executed by the described transactions and execution context data for those service executions, like names, types and values of parameters that were used for service invocations and return values of service executions. As an example, a transaction may execute a web service and the execution of this web service may be described by the URL used to address the web service, a query string describing names and values of the parameters used for the web service execution and a return code indicating a success status of the service execution. For the execution of remote method invocation (RMI) services, service identification data may include the name of the RMI server to which an observed RMI call was sent and identification data for the addressed method, containing name of a class providing the method, name of the method, a sequence of method parameter names and types and type of the return value (i.e., the signature of the method). Execution context data may contain names, types and values of parameters used for the remote method invocation and its return value.

The business value data extraction module may compare service identification data of transaction traces with patterns identifying services indicating the creation of business relevant values. As an example, such a pattern may contain the name of a service which corresponds to the creation of business relevant value.

After the business value data extraction module has detected the execution of a service that corresponds to a business value creation, it may as next step determine a quantity value for the created business value. In some examples, the quantity value may be fixed, as e.g., for a service that registers a new user of the monitored application. In this case, the business value quantity may always be 1, indicating the registration of one new user. For services, like services that indicate the purchase of goods, the quantity value may be the amount of revenue generated by the purchase activity. Other examples for services executions that create business value may include activities that indicate a user clicked on a paid advertisement, or services indicating the booking of a subscription by a user. Also, other services indicating that a user signed a contract with commercial relevancy like an insurance or mortgage contract may be recognized.

The extraction of a business value quantity from identified service executions may use parameters used for the service execution and service specific data provided by the application vendor. As an example, for advertisement clicks, the business value quantity may also be influenced by the individual selected advertisement, as the specific clicked advertisement may determine the amount of revenue generated by the click. For mortgages or insurance contacts, other parameters that are not directly related to the corresponding service execution, like risk parameters may be provided by the application vendor and used to calculate a business value quantity.

The business value data extraction module may apply a business value quantity extraction rule, which may e.g., define for a specific service the names of service parameters that contain a business quantity value, like e.g., the financial value of purchased goods. The business value data extraction module may apply this rule to execution context data of the previously identified service execution to fetch parameters corresponding to business value quantities, fetch the values of those parameters and calculate a business value quantity for the observed service call. Next to generated revenue, the business value data extraction module may also calculate other business relevant metrics for a monitored purchase, like e.g., its contribution to profit.

After a business value generating activity was identified and a corresponding quantity value was determined, the business value data extraction module may create a business value record 244, describing the type 245 (e.g. purchase activity, user registration activity or other activity having an economic impact), the location 246 (e.g. an identifier identifying the topology entity of the service that was used to generate the business value) and a quantity value 247 for the observed business value creation.

The business value record may then be forwarded 243 to a business value contribution detector 248.

The business value contribution detector 248 may on receipt of a new business value record fetch the end-to-end transaction trace record containing the service execution that caused the described business value generation. Afterwards, it may analyze the transaction trace record to identify the service executions of the end-to-end transactions that led to the business value generating service execution. The business value contributor may e.g., analyze the temporal sequence of service executions of the transaction and identify those service executions of the transaction that occurred before the business value generation as contributing service executions.

The business value contribution detector may also analyze service execution dependencies to identify contributing service executions. As an example, transaction trace data may describe the execution of service A. During its execution, service A may execute service B. This nested service execution of service B may be considered as service execution dependency, where service A depends on service B. The business value contribution detector may start with the business value generating service execution and then identify all services executions of the transaction that directly or indirectly depend on the business value generating service execution.

In a subsequent step, the business value contribution detector may fetch 249 the visit record of the currently analyzed business value generating transaction from the visit repository 236 and select the transactions of the visit that were executed before the business value generating transaction, as those transactions represent the navigation activities of the user that performed the visit that led to the execution of the business value generating transaction. All service executions of the so selected transactions may also be identified as business value contributing service executions.

Afterwards, the business value contribution detector may access 250 the topology model 254, to first identify and select the service entities of the topology model that represent the services that were executed by the previously identified business value contributing service executions. Service execution monitoring data contained in transaction traces may also contain data identifying the service that was executed. This identification data may be used to fetch the corresponding service entities from the topology model. The so identified services may be added to a set of contributing entities.

The business value contribution detector 248 may then use the structural dependencies stored in the topology model to identify those topology entities which directly or indirectly provide the service entities. Those topology entities may include entities for processes providing the previously identified service entities and entities for host computing systems or containers executing those processes. The so identified topology entities may also be added to the set of contributing entities.

The business value contribution detector may then update 251 a business value contribution aggregate for all contributing entities. As an example, topology entities may contain a sum value for business value contributions, and the business value contribution may increment this sum value for all contributing entities by the received business value quantity 247.

In addition, the business value contribution detector may create or update a business value contribution time series for each contributing entity. The business value contribution detector may e.g., first determine for a given identified contributing entity whether a time series for the notified business value type (i.e., as specified in the business value field 245 of the received business value record 244) for the given contributing entity exists in the time series repository 253. If no such time series exists in the time series repository, a new one with a key that both identifies the type of the generated business value and the given contributing entity is created and added to the time series repository 253. Afterwards, a data point is added to the fetched or created time series which describes the quantity of the generated business value and the time when it was generated.

Various types of business value contribution related analyses of the so created raw business value contribution data may be performed by the business value analysis module 260.

A business value contribution visualization and analysis module 265 may fetch the topology model data that was enriched with business value contribution data. The fetched topology model data may be used to generate a business value related visualization 270 of the topology model, which shows the extend of business value contribution of each topology entity. As an example, the accumulated business value contribution of each topology entity may be used to determine size or color of topology entities in the visualization. Such a visualizations may be used to identify topology entities with high or low business value contribution.

In addition, the business value contribution visualization and analysis module 265 may identify those topology entities which are contributing to large portions of created business value generation, for which no or only a limited number of backup entities exist. Such entities may be considered as critical for the economic success of a monitored application/environment, as a failure of such entities would also cause the loss of large portions of expected business value. The identified entities may be notified 271 to a user of the monitoring system with a recommendation to distribute their responsibilities to a greater set of entities to reduce the economic impact if one of those entities fails.

A business value resource allocation analysis module 266 may also fetch topology data containing business value contribution data and may in addition, fetch resource allocation data for the topology entities. Resource allocation data may include amount of main memory, CPU or network capacity, amount of persistent memory, or costs to maintain the entity. The business value resource allocation analysis module may compare for each topology entity the observed business value contribution and the recorded resource allocations. The business value resource allocation analysis module may e.g., identify and notify deviations between resource allocation and business value contribution. The business value resource allocation analysis module may e.g., identify topology entities for which the relative resource allocation is higher than the relative business value contribution and notify them as potential optimization candidates for resource allocation adaptation/reduction, as their contribution to economic success is below expectations.

A business value/performance value dependency analyzer 267 may fetch 263, for a given entity, time series data relating to business value contribution and time series data for performance or functionality related behavior for the entity. The business value/performance value dependency analyzer may then combine the fetched time series data and perform an analyze of the combined data to identify functional dependencies between business value contribution and performance or functional metric data. Identified dependencies may be notified 273 to a user of the monitoring system with a recommendation to e.g., take actions to change/improve performance or functionality characteristics of a given entity because such improvements would most probably also increase the amount of generated business value.

A business value based conversion funnel analysis module 268 may fetch 264 visit data for the navigation path of a conversion funnel and use business value contribution data extracted from those visits to calculate a business value weight for each step in the navigation path defined by the conversion funnel. The calculated business value weight may then be used to evaluate alternative paths through the conversion funnel, to e.g., identify those path variants in which the highest loss of business value (instead of highest loss of transaction count as known in prior art) occurs. This information may be notified 274 to a user of the monitoring system, which may use it for a business-value driven optimization of the conversion funnel.

Referring now FIGS. 3a-3h, which conceptually describe data records that may be used to transfer transaction and topology monitoring data form agents to a monitoring server, to represent end-to-end transaction records, visits, and a topology model on a monitoring server and to store business value extraction rules.

FIG. 3a shows a service execution record 300, which may be created by process agents 208 or browser agents 210, to describe a specific service call and the execution activities caused by the service call. A service execution record may contain but is not limited to an execution identifier identifying the specific monitored service execution, a service identifier 302, which identifies the service that was used by the observed service execution (i.e., specific interface of a specific process that received and processed the service request causing the described service execution. The service identifier also identifies the called service in the topology model 254 of the monitored environment), execution description data, 303 describing the monitored service execution in detail, an optional parent execution identifier 306, which may identify another service execution record that describes the service execution that caused the service execution described by thee service execution record and optional visit identification data 307, which e.g., identifies the web browser instance that originated the request that caused the described service execution.

Execution description data 303 may contain but is not limited to performance and functional metric data 304, describing e.g. the response time of the observed service execution, resources used for the service execution, indications for a success state of the executed service (i.e. service was executed as expected, failed completely, failed to some extent, etc.) and performance and functional metric data of individual portions of the observed service execution, like e.g. individual methods or functions that were executed to fulfill the service request, and captured execution parameters 305, which describe names, types and values of individual parameters of the observed service call and type and value for return values or results of the observed service execution. Captured execution parameters may also contain values, names and types of parameters and return values of individual method or function execution that were included in the monitored service execution.

End-to-end transaction records 310, as described in FIG. 3b, may be used to store end-to-end transaction traces in a transaction repository 237. Individual end-to-end transaction records 310, each describing a specific service execution may be linked together to describe distributed transactions formed by multiple, nested service executions.

An end-to-end transaction record 310 may contain but is not limited to a service execution identifier 311, identifying a specific service execution that is part of a monitored end-to-end transaction, a service identifier 312, identifying the service on which the service execution was performed, execution description data 313, describing the service execution by performance and functional metric data and by captured execution parameters (see e.g. also execution description data 303 of service execution records 300), a visit identification data filed 317 to identify transaction traces that originated from the same source (i.e., web browser instance) and a nested service call list 319. A nested service call list 318 may contain a list of service execution identifiers 319, that identify those end-to-end transaction records 310 that describe service executions that were caused by the service execution described by the end-to-end transaction record 310. Visit identification data 317 may e.g., contain data identifying a web browser instance that issued a request that caused the service execution described by the end-to-end transaction record. Other end-to-end transaction records describing nested service executions that were not directly caused by a web browser interaction may not contain visit identification data.

Visit records 320, as described in FIG. 3c, may be used to store sequences of transactions that originated from the same web browser. A visit record 320 may contain but is not limited to visit origin data 321, identifying a specific browser instance and a transaction list 322, containing end-to-end transaction records 310 of transactions that originated from the browser instance identified by the visit origin data 321.

The end-to-end transaction trace records 310 stored in the transaction list 322 of a visit record may be used to describe a specific interaction of a specific end-user (i.e., the end-user operating the browser instance identified by visit origin data 321). To segregate different interactions of one specific end-user, only consecutive transactions with a delay between two consecutive transactions that is below a certain threshold may be added to the same visit record. If the delay between two consecutive transactions exceeds this threshold, this may be interpreted as termination of the currently ongoing interaction. The next observed transaction after the threshold exceeding delay may be considered as first transaction for the next interaction. This transaction may be assigned to a new visit record 320.

Time series records 330 as shown in FIG. 3d, may be used to store time series data for various types of metrics. A time series record 330 may contain but is not limited to a type field 331, which defines the type measurement contained in the time series, like e.g. CPU or memory usage, service or method response time or revenue, a topology location field 332, identifying the topology entity on which the measurement values contained in the time series were observed, like a service entity on which response time or revenue values were observed or a process or host entity on which CPU or memory usage was observed, and a data point list 333, containing a sequence of data points 334, each data point describing an individual observation of the specified type 331 on the specified location 332.

Data point records 334 may contain but are not limited to a time stamp entry 335, holding the point in time when a specific observation was made, and a value field 336, containing the extend of the observation, like number of milliseconds for observed response times, a number of bytes for memory usage, a percentage for CPU usage or a monetary value for business-relevant values like revenue data.

FIG. 3e shows a topology record 340, which may be used to transfer topology data from an agent to a monitoring server. Topology records 340 may contain but are not limited to a topology identifier 341, identifying a component of the monitored environment and also the topology entity representing the component in the topology model of the monitored environment, descriptive data 342, which describes the type of the component and its features and capabilities, an optional parent topology identifier 343 identifying the component/topology entity that provides, runs or contains the topology entity, and metric data 344, describing e.g. resources like CPU or network capacity, main or persistent memory provided/used by the component.

Topology entity records 350, as shown in FIG. 3f, may be used to represent entities of a topology model. A topology entity record may contain but is not limited to a topology identifier 351 uniquely identifying a topology entity record in the set of topology entity records forming a topology model, descriptive data 352, containing data describing the component of the monitored environment that is represented by the topology entity record, an optional parent topology identifier 353 identifying the topology entity record representing the parent component of the component described by the topology entity record, and a business value aggregates set 354, which contains business value type aggregate records 355.

Business value type aggregate records 355 may be used to store an aggregated value for business value contributions observed for a specific topology entity for a specific type of business value. A business value type aggregate record may contain but is not limited to a business value type 356, specifying the type of the aggregated business value, like e.g. revenue or amount of new users, a time period 357, specifying the time period which an aggregated value represents, and an aggregated value 358, containing an aggregate of observed business value contributions for the specific type and the specific time period, like e.g. a sum of revenue/user generation contributions observed during the represented time period.

A topology communication record 360, as shown in FIG. 3g, may be used to describe the communication of two topology entities in the topology model. A topology communication record may contain but is not limited to a client topology identifier 361, identifying the topology entity that initiated the communication activity, a server topology identifier 362, identifying the topology entity that received the communication activity and a communication type field 363, specifying the type of the observed communication. Exemplary communication types include transaction related service requests sent during the execution of a (client) service to another (server) service, or not transaction-related communication e.g., between processes, where a (client) process may initiate the communication and a (server) process may receive it.

A business value extraction rule 370, as shown in FIG. 3h, may be used to analyze end-to-end transaction trace data to detect and localize creation of business relevant value and, in case creation of business relevant value is detected, to quantify the generated business value. Generally, the purpose of a business value extraction rule 370 is twofold. A first portion of the rule may be used to analyze transaction trace data to determine the existence of business value generating activity by the monitored transaction. The second portion of the rule is applied after a business value generating activity was identified and is used to calculate a quantity value for the identified business value generating activity.

The detection part of a business value extraction rule, which identifies the execution of a specific functionality is typically only based on technical aspects of the monitoring system, like the names of services or methods that identify portions of functionality executed by the monitored system. It is only relevant that those aspects correctly identify the execution of functionality that generated business value.

The quantity calculation part may, in addition to data describing the execution of identified functionality, like names and values of parameters used for service and method executions, also use business specific parameters to calculate a quantity value. Those business specific parameters are typically provided by the operator/vendor of the monitored system. As example, a service may be related to selling various types of insurance policies, including e.g., car insurances or fire insurances. In this case, different weight parameters may be provided for car insurances and fire insurances that represent the different risks for those types of insurance contracts. Those parameters may in addition to parameters captured form observed service executions be used to calculate a quantity value.

As another example, a service may be related to advertisement that is presented to users of an application, and each specific advertisement may be assigned a specific monetary reward for the application vendor if an end-user clicks on the advertisement. Service calls corresponding to clicks on presented advertisement may be identified by business value extraction rules, the specific clicked advertisement may be identified, and the reward earned for this click may be determined and used as business value.

A business value extraction rule 370 may contain but is not limited to a business value type 371, specifying a particular type of business value, like e.g. revenue or value of purchased goods, a service identifier 372, which identifies a service for which an execution indicates the generation of business value of the particular type, service parameter identifier 373, which identify parameters of service executions that are indicators for an amount of generated business value, and a service value parameter processing rule 374, which contains a procedure to calculate a business value quantity from the values of parameters identified by service parameter identifiers 373. As an example, a web service URL may contain a base section, identifying a web server providing the service, an application name specifying an application that may provide multiple web services, and a web service name identifying a specific web service of the application. A service identifier 372 directed to the identification of web services may e.g., contain an application name and a web service name to identify a specific web service of a specific application. Variant service identifiers may only contain a web service name to identify and match to web services of different applications.

Variant embodiments may instead of or in addition to service execution based business value extraction rules, also provide business value extraction rules that are based on the executions of methods or functions that represent portions of service executions.

Such business value extraction rules may contain a method/function identifier instead of or in addition to a service identifier, where the method/function identifier identifies a method or function e.g., by a class name, a method name, and a method signature. Such variant business value extraction rules may contain method/function parameter identifiers and parameter processing rules instead of service parameter identifiers/processing rules.

Coming now to FIG. 4, which visually describes the combined analysis of structural and transactional monitoring data to detect and localize the occurrence of business relevant activity and to use structural and transactional dependency data to identify entities that contributed to the business relevant activity.

Browser instance B1 executes the transaction sequence T1, T2 and T3 and the delay between those transaction is below the visit-separation threshold. Consequently, the transactions are added to the same visit V1 420.

Transactions of the sequence navigate the user through web pages provided by a monitored application, thereby using various of its services, like FE1 401, FE2 402, BE1 406, BE2 407 and BE3 410. Transaction T1 is initiated 430 with an execution of service FE 1, which calls 431 service BE 406, which ends the execution of transaction T1. Following transaction T2 is started 432 with an execution of service FE2 402, which in turn calls 433 service BE2 407. A business relevant activity 434 was observed during the execution of service BE2 by transaction T2. T2 ends after the execution of BE2 is finished. T3 is started 435 afterwards with an execution of FE2, which in turn calls 436 service BE3.

The observation of the business relevant activity performed by transaction T2 triggers a back tracking process, which identifies all service calls performed by T2 and all transactions of the visit to which T2 belongs that were executed before T2. The back-tracking process starts with the execution of service B2 407, which caused the business relevant activity 434. Transaction trace data of T2 is used to identify services that were called by T2 before the business relevant activity was observed. This includes service executions of T2 that were completely executed before the business relevant activity (i.e., service executions started and ended before the business relevant activity) and services that are in a direct or indirect nesting relationship with the service performing the business relevant activity (i.e., service that directly or indirectly called the service performing the business relevant activity).

Transaction back-tracking first identifies 440 that T2 executed service FE2 402 before service BE2 and adds service FE2 to a set of contributing entities. Afterwards it detects that T2 was triggered by browser B1 400 and that T2 belongs to visit V1 420 initiated by browser B1.

Back-tracking then queries transactions contained in V1 that were executed before T2. Only transaction T1 matches this query. All service executions performed by T1 (i.e., service FE1 401 and BE1 406) are also identified 442 and 443 and added to the set of contributing entities.

As transaction T3 was executed after the observed business relevant activity, it is not considered in the search for contributing entities.

After the transaction-based backtracking to identify contributing entities is finished, a search for entities on which contributing services depend is started. Entities on which contributing services depend directly or indirectly are also added to the set of contributing entities.

Topology data also describes structural dependencies of topology entities, like e.g., services provided by processes or processes running on hosts by vertical relationships. Those vertical relationships may be used to identify entities on which contributing services depend. In a first step, vertical relationships identifying the processes that provide contributing services may be analyzed to identify contributing processes. For contributing service FE1, vertical relationship 451 may be followed 470 to identify process FE1 403 which is added to the set of contributing entities. Process FE2 404 may be identified 472 via vertical relationship 454 and process BE1 may either be identified via vertical relationship 456 from service BE1 406 or via vertical relationship 457 from service BE2.

After contributing processes were identified, the hosts executing those processes may also be identified using vertical relationships. Host H1 405 may be identified as contributing entity either via its vertical relationship 452 to process FE1 403 or its vertical relationship 455 to process FE2. Host H2 may be identified 476 as contributing entity via its horizontal relationship to process BE1 408.

It is noteworthy that individual entities may be visited multiple times during the traversal of transaction related and structural dependencies to identify contributing entities, and measures may be applied to assure that each identified contributing entity exists only once in the resulting set of contributing entities.

Referring now to FIGS. 5a-5d which provide flow charts of various processes that may be used to process topological, and transaction related monitoring data provided by agents.

FIG. 5a conceptually describes the processing of service execution records received from process agents 208 or browser agents 210 by a transaction/visit data processor module.

The process begins with step 500, when a service execution record 300 is received. In following step 501, the received service execution record may be analyzed and a new end-to-end transaction record 310 for the received service execution record may be created. If parent execution identifier data 306 is available in the received service execution record, an end-to-end transaction record with a service execution identifier 311 matching the parent execution identifier may be fetched. A new service execution identifier 319 record may be created in the nested service call list 318 of the fetched end-to-end transaction record. The created service execution identifier 319 may be set to refer to the service execution identifier 311 of the new created end-to-end transaction record. If the received service execution record contains visit identification data 307, it may be stored in the visit identification data field 317 of the created end-to-end transaction record. Step 501 incrementally creates data structures of linked end-to-end transaction records that describe observed service executions of distributed transactions.

Following step 502 may then extract measurement data from the new service execution record and create or update corresponding time series records 330 in the time series repository 253. Step 502 may e.g., extract measurement values for service response time, service execution success state and other metrics for the creation of time series data. The process of time series record creation/update is described in FIG. 5c.

Subsequent step 503 then updates the topology model if required. In case the service on which the observed service execution was performed is not yet available in the topology model, step 503 may extract service identification and description data from the received service execution record and create a corresponding topology entity for the new detected service in the topology model. In addition, step 503 may also link the new service entity to other topology entities according to its observed location and call dependencies. Step 503 may e.g., identify the entity providing the new detected service and connect the entity representing the service with the entity providing the service with a structural connection. A call dependency for the new service may be derived from a received parent execution identifier 306, which identifies the service from which the new detected service was called. A transactional/communication related dependency may be added to the topology entity describing this functional dependency. Both structural and functional dependencies are directed and define a role for each of the connected entities. For transactional/communication related connections, the calling and the called entity may be defined to describe a call direction between the entities. For structural connections, a providing entity and a consuming entity may be identified to describe structural dependencies (i.e., a host computing system provides abilities to run processes and a process consumes those abilities, or a service consuming resource provided by the process that provides the service). The process then ends with step 504.

Coming now to FIG. 5b, which describes the creation of visit records to group observed end-to-end transactions by their origin (i.e., web browser instance) and their temporal distribution. The process starts with step 510, either when a new end-to-end transaction record is available, or when a specific time since the last execution of this process (i.e., 10 seconds, 1 minute, etc.) has elapsed.

Following step 511 selects those end-to-end transactions in the transaction repository that are not yet assigned to a visit record 320, and groups them according to their origin. Step 511 may e.g., fetch all end-to-end transaction records from the transaction repository that are not contained in the transaction list 310 of a visit record 320 stored in the visit repository 236.

The fetched transactions may then be grouped according to their visit identification data to form groups of transactions that originated from the same source (e.g., browser instance).

Following step 512 may then sort the transactions of each group identified by step 511 by their start time to form transaction sequences. These transaction sequences may then further be segregated in visit transaction sequences by analyzing the duration between the start time of consecutive transactions and starting a new visit sequence when this duration exceeds a certain visit inactivity threshold.

Following step 513 uses the identified visit sequences to create new or update existing visit records. Step 513 may for each identified visit transaction sequence query the visit repository for a visit record with matching visit origin data 321 that describes a still ongoing visit (i.e., visit inactivity threshold did not elapse since start time of the most recent transaction in the transaction list of the visit). In case such a visit record exists, the transactions visit transaction sequence may be appended to the transaction list 322 of the fetched visit record.

Otherwise, a new visit record 320 may be created, its visit origin data 321 may be set to the visit origin data for the visit transaction sequence, the transactions of the visit transaction sequence are added to the transaction list 322 and new visit record is stored in the visit repository 236.

Step 514 may then select visit records from the visit repository that represent already finished user interactions (i.e., the time that elapsed between the start time of their most recent transaction execution exceeds the visit inactivity threshold) for which no business value contribution analysis was performed, and trigger business value contribution analysis of those visit records. The processes performed during business value contribution analysis are describe in detail in FIG. 6b. Step 514 may flag or otherwise indicate visit records for which business value contribution analysis was performed to distinguish already analyzed visit records from new, not yet analyzed ones.

Creation or update of time series records 520, e.g., in response to the receipt of new measurement data from transaction tracing or topology monitoring data, is described in FIG. 5c. The process starts with step 520, when data describing a measurement data point in form of metric type, value, measurement time stamp and topology location is received.

Following step 521 queries the time series repository 253 for a time series record 330 with a metric type 331 matching the received metric type and topology location 332 matching the received measurement location data. If no matching time series record is found, a new one is created for the received metric type and location and added to the time series repository.

Step 522 afterwards creates a new data point record 335, using the received measurement time stamp as time stamp 335 and the received measurement value as value 336. The created data point record is then appended to the data point list 333 of the fetched or created time series record 330. The process then ends with step 523.

The processing of topology monitoring data in form of topology records 340 by the topology data processor 233 is shown in FIG. 5d. The process starts with step 530 when a new topology record 340 or topology communication record 360 is received.

Following step 531 then updates the topology model according to the received topology monitoring data. In case a topology record 340 is received and the topology record describes a topology entity that is not yet present in the topology model, step 531 may create a corresponding topology entity and establish structural relationships according to received parent topology identifier data 343. A parent topology identifier 343 identifies the topology entity on which the notified topology entities depends. As an example, for a notified process entity, the parent topology identifier may identify the topology entity representing the host computer or container running the process. Step 531 may in this case create a structural relationship for the new entity representing the process and the entity on which the new entity depends (i.e., entity representing the host or container executing the process). The created structural relationship also describes the direction of the structural dependency (i.e., describes that the process depends on the host/container on which it is executing). If a topology record is received for which a corresponding topology entity record already exists in the topology model, descriptive data 352 of the topology entity may be updated according to new descriptive data 342 received with the topology record.

In case a topology communication record 360 is received, a communication relationship may be added to the topology model that represents the monitored communication activity.

Following step 532 extracts metric data 344 from the received topology record and creates or updates corresponding time series entries for those metric data as described in FIG. 5c. The process then ends with step 533.

Coming now to FIGS. 6a-6b which describe processes to identify business relevant activities in transaction traces and to identify activities and entities that contributed to the observed business relevant activities.

FIG. 6a describes the analysis of individual transaction traces of a visit record 320 to identify business relevant activities. The process is executed for each end-to-end transaction record 310 contained in the transaction list of a received visit record 320 and for each available business value extraction rule 370. The process starts with step 600 when a business value extraction rule 370 and an end-to-end transaction trace 320 are received.

Following step 601 applies the received business value extraction rule to the currently analyzed end-to-end transaction trace record. Step 601 may e.g., determine whether the service execution described by the end-to-end transaction record matches the service identifier 372 of the received business value extraction rule.

If the service identifier matches, step 601 may continue by fetching service parameters stored in the captured execution parameter section 315 that match the service parameter identifier data 373 of the received business value extraction rule and then apply the service value parameter processing rule 374 to the fetched parameters to calculate a quantity value for the identified business relevant activity. More specifically and by example, step 601 may first determine whether a service execution described in the received transaction trace record represents the purchase of goods or service, the charging of a credit card, clicking on an advertisement or other, business relevant activities. Step 601 may use identification and description data of the service that was executed, like the name or signature of the executed service, or the name/network address of the server providing the service to determine whether the execution of the service represents the generation of business relevant value.

Afterwards, step 601 may determine a quantitative value of the identified business relevant activity, like for purchases of goods or services, the economic value of the purchased goods or services, for credit card activities amount charged and currency, and for advertisement clicks, the reward earned for a click on the specific advertisement. To determine the quantity of the generated business relevant value, step 601 may use data describing the performed service execution, like the values of specific parameters that were provided for the service execution. A business value extraction rule may specify a service name "checkout" in its service identifier section 372 which indicates that each time that a service named "checkout" is executed, business relevant value may be created. Further, execution of this service may require parameters named "purchaseSum" and "currency", and the service parameter identifier 373 may specify these parameter as containing data that is relevant for the quantity of a generated business relevant value. The service value parameter processing rule 374 may then specify that the value of parameter "purchaseSum" may be extracted and converted into a numeric value, and the value of parameter "currency" may be extracted and converted into a currency symbol.

Following decision step 602 determines whether the currently analyzed end-to-end transaction record describes a business relevant activity (i.e., end-to-end transaction record matches service identifier 372, service parameters could be extracted, and a quantity value could be calculated), and continues with step 603 in case business value generation was detected. Otherwise, the process continues with step 604.

Step 603 performs an identification of activities and entities that contributed to the observed business value generation. A detailed description of this identification process is shown in FIG. 6*b*. Step 603 may also generate a business value record 244, which describes type 245, location 246 of the observed business relevant activity and the quantity 247 of the generated business value. The type of the generated business relevant activity may be derived from the type 371 of the currently processed value extraction rule, the location may be derived from the service topology identifier 312 of the currently analyzed end-to-end transaction record (this service topology identifier identifies the topology entity that was used for the service execution described by the currently processed end-to-end transaction record). The quantity value 247 may be set to the value calculated in step 601. I addition, the point in time when the observed business value generating activity was performed may be added to the business value record 244. The created business value record may be used as input for the process to identify contributing activities and entities as described in FIG. 6*b*.

Following step 604 determines whether a next referred end-to-end transaction is available that has not been processed. Basically, step 604 performs a tree search along the directed tree that is formed by end-to-end transactions and their nested service call lists to identify an end-to-end transaction record that was not yet analyzed for business value generation. If such an end-to-end transaction record could be detected, the process continues with step 605 and 601 which analyze the detected end-to-end transaction record for business value generation. Otherwise, the process ends with step 606.

Coming now FIG. 6*b*, which describes the identification of activities and entities that contributed to a detected business relevant activity. The process starts with step 610, when data describing business relevant activity, e.g., in form of a business value record 244, and data describing its transactional context, like the end-to-end transaction trace data containing the activity and the visit record containing this transaction trace data are received. The received end-to-end transaction trace data has the form of a tree of end-to-end transaction trace records that represents the service executions that were performed by a monitored distributed transaction and the temporal and nesting dependencies and relationships of those service executions. An end-to-end transaction typically starts with a first service execution that was e.g., triggered by a request that was received from a web server. This service execution is represented by an end-to-end transaction record 310. During execution, this service may also call other services. The executions of those other service calls are described in corresponding end-to-end transaction records and the fact that those other services were triggered by calls from the first service execution is represented by the service execution identifiers 319 in the nested service call list of the end-to-end transaction trace representing the first service execution.

End-to-end transaction records 310 represent the nodes of a tree that describes the execution of services by a distributed transaction, and service execution identifiers 319 in the nested service call lists of those records form the edges of this tree and describe call dependencies between different service calls. The sequence of service execution identifiers in a nested service call list also describes the sequence of performed service calls.

Step 611 analyzes the received end-to-end transaction trace data to identify the service executions on which the observed business relevant activity depends. It may e.g., start with the end-to-end transaction record 310 for which the business relevant activity was observed and continue by identifying direct and indirect parent service executions for the service execution that performed the business relevant activity. Step 611 may, to detect the end-to-end transaction record that represents the parent service execution of a service execution represented by a given end-to-end transaction record, query an end-to-end transaction record that contains a service execution identifier 319 in its nested service call list 318 that matches the service execution identifier 311 of the given end-to-end transaction record. Alternatively, end-to-end-transaction record may contain an additional parent service identifier field which may be used to find parent end-to-end transaction records.

During its execution, a specific service may request other service executions, which may be referred to as nested or child service executions, and the specific service may be referred to as direct parent service execution of those other service executions. The child service executions of the specific service execution may in turn trigger other service executions, for which the specific service execution is then an indirect parent. Detection of direct and indirect parent service executions may start with the service execution that performed the business relevant activity and then recursively select all parent service executions, until the service execution that started the observed end-to-end transaction is reached. Identified direct and indirect service executions may be added to a set of service executions that were required for the business relevant activity. Afterwards, for each identified parent service execution, all its sibling service executions that were executed before the parent service execution may be selected. For a given service execution, first its parent service execution may be fetched and then all direct child service executions of the parent service execution that were performed before the given service execution may be selected. In terms of end-to-end transaction records 310, a service execution identifier 318 representing the given service execution may be identified in the nested service call list 318 of the end-to-end transaction record representing its parent service execution, and then all service execution identifiers that are listed before the service execution identifier 318 representing the given service execution in the nested service call list may be selected as earlier siblings of the given service execution. Those earlier siblings may also be added to the set of required service executions. Finally, all direct and indirect child service executions of the earlier siblings may also be added to the set of required executions.

Some variant embodiments may, instead of traversing tree-relationships of observes service executions, maintain a list of service executions that contains start time and service execution identifier, and use this list to identify all service executions that were performed or at least started before a business relevant activity and select those as required service executions. Other variant embodiments may, after business relevant activity by a transaction was identified, select all service executions of the transaction as required service executions.

Following step 612 then analyzes the visit record containing the transaction that performed the business relevant activity. Step 612 may first select all transactions in the visit record that were executed before the transaction containing the business relevant activity and then add all service executions of those transactions to the set of required service executions.

Variant embodiments may instead select all transactions in the visit record and add their service executions to the set of required service executions.

After the service executions that were required for an observed business relevant activity were identified by steps 611 and 612, subsequent step 613 selects the service entities describing the services on which the required service executions were performed and assigns data describing the contribution of those services to the observed business relevant activity.

To better illustrate the difference between a service execution and a service, a service execution may e.g. be considered as the sending of an individual HTTP request to a web server, and the processing of the request by the web serve as a service execution, and the web server (or the specific HTTP service endpoint of the web server directed to the handling of this specific request) may be considered as the corresponding service that was used for the service execution.

Step 613 may, for each identified required service execution, identify the topology entity representing the executed service and assign business value contribution data to them, e.g., by incrementing a specific business value quantity aggregate value for those service entities, or by creating or updating time series records 330 describing the business value contributions of those service entities over time. Step 613 may, for each end-to-end transaction record 310 describing a required service execution, use the service (topology)n identifier 312 to fetch the topology entity record 350, describing the executed service. Afterwards, it may select the business value type aggregate 355 with a business value type 356 matching the type of observed business value generation and use the observed business value generation quantity to update the aggregated value 358, e.g., by adding the observed business value quantity to the already stored aggregated value.

Step 613 may, alternatively or in addition, query the time series repository 253 for a time series record 330 with a metric type 331 matching the type of observed business value generation and a topology location matching the identified service entity. In case no matching time series record is found, a new one using business value type and service topology location may be created and added to the time series repository. Afterwards, a new data point record 334 may be created using the point in time when the business value generation was observed as time stamp 336 and the determined business value quantity as value 336.

The created data point record may then be added to the data point list of the previously fetched or created time series record 330.

Subsequent step 614 may then use structural dependencies described in the topology model to identify those entities on which previously identified service entities depend. Step 614 may e.g., for each identifies service entity identify and select the entity representing the process providing the service, the container or host computing system executing the process and, in case executing is performed on virtualized hardware, also the virtualization component (i.e., hypervisor) providing the virtualized hardware. Step 614 may e.g., start with the topology entity records 350 representing identified service entities and then follow parent topology identifiers to identify and select entities on which the service entities directly or indirectly depend on. Step 614 may then also assign business value contribution data to those identified entities, e.g., in form of business value quantity aggregates or time series, as already described in step 613.

The process then ends with step 615.

Coming now to FIGS. 7a-7c, which conceptually describe exemplary analyses that enrich the topology model of a monitored environment using aggregated business value contribution data.

FIG. 7a shows a process that uses aggregated business value contribution data to create a visualization of a topology model of a monitored environment that describes the business relevance of individual components of the environment.

The analysis process starts with step 700, when a request is received for the creation of a topology model visualization that describes the business value contributions for a specific type of business value for all topology entities. The received request may contain an identifier for a specific type of business value, like e.g., revenue, contribution margin or new registered users and it may also specify a time period that defines the period for which observed business value contributions should be considered. Following step 701 may then calculate an aggregated business value contribution quantity for each topology entity for the requested time frame, e.g., by using business value time series or business value aggregate data for the specified business value type.

Following step 702 may then mark the visualizations of topology entities using the previously calculated business value contribution quantity, e.g., using color coding and present the so modified topology entity visualizations to a user of the monitoring system. The process then ends with step 703.

The visualization data provided by process 7a allows a user to identify portions of the monitored system having high business relevancy, for which additional investments/resource allocations may be justified and other portions of the monitored environment with low business value contribution, for which investment/resource allocation may be reduced.

FIG. 7b describes a variant analysis, that compares observed business value contribution data with assigned resources/costs of individual entities. The result of this analysis may be a visualization of the topology model that relates the relative business value contribution of a specific type (e.g., normalized using the max. observed business value contribution) with the relative amount of a specific resource (e.g., normalized using the max. amount of the resource assigned to a single entity. Example resources include assigned main memory, CPU cycles or network bandwidth) assigned to the entity. Topology entities for which proportional resource assignments significantly exceeds the relative business value contribution may be highlighted as potential optimization candidates.

The process starts with step 710, when a corresponding analysis request containing a specific business value type and a specific resource type is received. Following step 711 then calculates for each entity a relative business value contribution for the specific business value type, e.g., by first determining the highest contribution quantity and dividing all business quantities by this highest contribution. Subsequent step 712 may then calculate a relative resource allocation for the specific resource type for each topology entity, e.g., by first determining the max. allocation of this resource to an entity and then dividing all allocations by this max allocation.

Following step 713 may then, for each topology entity, compare relative business value contribution and relative resource allocation data and highlight those entities as potential optimization candidates where relative resource contribution is significantly higher than relative business value contribution. As an example, a threshold value, like e.g., 5% or 10% may be defined and entities may be highlighted for which the difference between relative business value contribution and relative resource contribution exceeds this threshold. The process then ends with step 714.

Coming now to FIG. 7c, which conceptually describes an analysis to identify business value contribution related bottlenecks of a monitored environment. The idea is to find entities, like services or processes that are contributing to a high percentage of generated business value, for which only a small number of instances is available, which would mean that a failure or crash of one of those instances causes the loss of a high percentage of business value. Such identified entity groups may be highlighted and marked as candidates for measures to improve reliability, like e.g., distributing identified services among larger set of processes running on different host computing systems, probably using different virtualization entities in case those are virtualized host systems.

The process starts with step 720, when a request is received to identify topology entities that represent a bottleneck for a specific type of business value. The request may contain a distribution threshold defining a minimal number of equivalent entities (i.e., number of different processes providing a business relevant service), a threshold defining a minimal relative percentage of business value contribution and a specific type of business value for which bottleneck entities should be identified.

Following step 721 identifies groups of topology entities that serve the same purpose, like e.g., different processes running the same code and providing identical services, for which the number of instances in the group is below the distribution threshold.

Afterwards, step 722 may calculate the relative business value contribution for the specified business value type for each entity group identified in step 721 and select those groups for which the relative business value contribution is above the received business value threshold.

Following step 723 may report the identified groups of functional equivalent topology entities for which the number of instances is below the distribution threshold and for which also the relative business value contribution is above the received business value threshold to a user as candidates for further distribution of functionality by e.g., increasing the number of equivalent instances. The process then ends with step 724.

Coming now to FIG. 8, which conceptually describes a process to identify functional dependencies between monitoring data describing performance or functional aspects of monitoring entities like services and monitoring data describing and quantifying business relevant activities observed on those monitored entities.

The process starts with step 800 and may e.g., be performed cyclically for each service entity in the topology model, and each execution may be performed for a specific type of performance or functional metric (e.g., response time or error rate), a specific type of business related metric (i.e., observed revenue generation contribution of a service) and for a specific time period.

Step 801 may then fetch a time series record 330 having a topology location identifier 332 matching a currently processed service entity and having a type 331 matching the received business value type from the time series repository 253 and Subsequent step 802 may fetch a time series record, also for the currently processed service entity but with a type 331 matching the received performance or functional metric.

Step 803 may then select data points from the previously selected performance or functional time series and the business related time series that match the received time period. Step may then use time stamp data 335 to map data points representing a measured performance or functional characteristic of the service at a specific point in time with data points describing concurrently observed business relevant activities observed at the same time to create pairs of temporally correlated measurements, where one member of the pair represents a performance/function related observation, and the other member of the pair represents the quantity of an observed business value generation activity. For performance/function related observation for which a temporally correlating business related activity is not available, either a business value activity with zero value may be assumed. Alternatively, such performance/function related observation may be ignored.

Step 803 may use the so created measurement pairs to generate a set of two-dimensional data points, where one dimension represents the performance/functional metric, and the other dimension represents a temporally correlating business value generation event.

Following step 804 may then analyze the type of the currently analyzed performance/functional metric to determine an appropriate correlation analysis method, like e.g., linear regression for scalar metric data like response times and logistic regression for metric data that is based on the occurrence of events, like e.g., error rate data. The selected regression method may then be applied on the set of data points generated in step 803 to determine the existence of a dependency between the performance/functional behavior of the currently processed service and a quantity of generated business value like e.g., amount of generated revenue or amount of new registered users.

Subsequent step 805 may then report identified dependencies to a user of the monitoring system. As an example, step 805 may report that improving the average response time of a specific service most probably improves the amount of generated revenue, because a negative correlation between response time generated revenue (faster response times map to higher revenue) was detected. The process then ends with step 806.

Coming now to FIGS. 9a-9b, which visually describe the identification of functional dependencies between performance or functional metrics and business value related metrics for a service entity. FIG. 9a shows a data scenario of combined performance or functional metric data and business-related metric data that indicates no dependency between performance or functional behavior and business value generation. It indicates that a change of performance/functional behavior has no influence on the amount of generated business value.

The combined performance/functional and business relevant metric data shown in FIG. 9b indicates a dependency between performance/functional behavior and generated business value, as on average, improved performance, or functional metric values (lower response times or error rates) are associated with improved business value metrics (higher revenue values).

Both FIGS. 9a and 9b describe a two-dimensional chart, where a first dimension x 901a and 901b represents performance/functional metric data and a second dimension y 900a and 900b represents business value related metric data. Data points 902a and 902b formed by individual performance/functionality observations (x dimension) and temporary correlated business relevant observations (y dimension) are shown in those charts.

Various types of regression analyses may be used identify functions that best describe the formations of those data points. In FIG. 9a, the data combined data points are distributed relatively equally and symmetrically in both dimensions, most data points are situated in the middle of the chart and no tendency is observable that would indicate a dependency between performance/functional behavior and amount of generated revenue. Linear regression analysis of the data points in FIG. 9a most probably results in a linear function 903a with a zero gradient. Zero gradient in this setup means that a change of performance/functional behavior of the analyzed service entity has no influence on generated business value.

In FIG. 9b, the data points already show a bias for higher business relevant values combined with lower performance/functional values (left side of chart) and for lower business relevant values combined with higher performance/functional values (right side of chart). A calculated regression function 903b shows a negative gradient, indicating that lower performance/functional values (i.e., response time, error rate) correspond to higher business-related values (e.g., revenue). The gradient of the detected regression function may be used to project an estimated business value increase 911b for a given specific performance/functional behavior improvement 910b.

Coming now to FIG. 10, which conceptually describes a process to analyze the efficiency of conversion funnels based on business value contribution data. Such conversion funnels are typically specified as a sequence of web pages of an application that direct a user from an entry page for the application to a page where users may perform business relevant activities, like e.g., purchasing goods offered by the application. The goal of a conversion funnel is to optimize the commercial output of an application by maximizing the number of users that perform business relevant activities on the application. The number of users of a conversion funnel is typically highest at the entry of the conversion funnel and generally decreases with every navigation step, as users may drop out with every navigation step, until the conversion page is reached. It is one goal of conversion funnel optimization to minimize the number of users that drop out of the conversion funnel before they reach the conversion page and perform the desired business relevant activities.

Variant conversion funnels may provide different, alternative path from an entry page to a conversion, see e.g., FIG. 11, the first alternative path from node/page 1100 via node/page 1105 and the second alternative path via node/page 1106.

For the optimization of conversion funnels with alternative paths, it may be beneficial to consider the business value generated by individual executions of the conversion funnel in addition to usage frequencies (i.e., number of converting executions vs. number of dropouts).

The process starts with step 1000, when a conversion funnel definition with alternative paths is received, together with a time period for which an analysis should be performed. A conversion funnel with alternative paths is given when multiple navigation paths exist from an entry page to a converting page. See e.g., FIG. 11 for a simple example of such a conversion funnel, where navigation paths start with entry node/page 1100 and continue with node/page 1102. From 1102 there are two alternative paths to 11045 or 1006, which join in 1109. The conversion funnel terminates with conversion page/node 1111. The conversion funnel definition may be received in form of a sequence of identifiers for web pages that represent a desired navigation path that guides a user to a conversion web page. This sequence may contain branches (see node 1102 in FIG. 11), which start alternative paths and merges (see node 1109 in FIG. 11), which combine alternative paths.

Following step 1001 selects visit records 320 describing visits that entered the conversion funnel during the received observation period and that either reached the conversion page and caused a business relevant activity, or that terminated (dropped out) at some stage/page of the conversion funnel. Step 1001 may e.g., select all visit records that describe a navigation path that started at the entry of the conversion funnel during the received analysis time period. Referring to the example depicted in FIG. 11, this may be all visits that started at node/page 1100.

Following step 1002 first identifies converting visits those visits contained in the set of visits selected by step 1001 that followed the conversion funnel and then created a business value. To identify converting visits, step 1002 may compare the navigation paths described in received visits with the conversion funnel definition and then select those visits which followed the conversion funnel from the entry node to the conversion node. Afterwards, step 1002 may analyze transactions in the selected visits that were executed on the conversion page to determine whether a commercial, business-related value was created by one of those transactions. If multiple transactions that were executed on the conversion page created business-relevant value, the created business value contributions may be aggregated.

Referring again to the example shown in FIG. 11, step 1002 may identify those visits that describe a navigation path from node 1100 to 1102, then either to node 1105 or node 1106, then to node 1109 and finally to node 1111, for which transactions executed on node 1111 indicate the generation of business relevant value.

Step 1003 may then, for each converting visit identified by step 1002, assign the business value created by the converting visit to each conversion funnel node that was passed by the visit. Step 1003 may also record for each conversion funnel node the number of passing converting visits. After all converting visits are processed, step 1003 may calculate a business value weight for each conversion funnel node by dividing the accumulated assigned business value for each node by the number of passing converting visits.

Referring again to the example of FIG. 11, and assuming a first converting visit passing nodes 1100, 1102, 1105, 1109 and then 1111, thereby creating business value of 10 (currency) units and a second converting unit passing nodes passing nodes 1100, 1102, 1106, 1109 and then 1111 and creating a business value of 20 units. In this case, step 1003 may record two converting visits for nodes 1100, 1102, 1109 and 1111 and one converting visit for nodes 1105 and 1106. The aggregated business value for nodes 1100, 1102, 1109 and 1111 would be 30, for node 1105 it would be 10 and for node 1106 it would be 20. The calculate business value weight would be 15 (30 divided by 2) for nodes 1100, 1102, 1109 and 1111, 10 for node 1105 (10 divided by 1) and 20 for node 1106 (20 divided by 1). Although the number of converting transactions is the same for nodes 1105 and 1106, node 1106 gets a higher business value weight, because the visits passing via node 1106 on average create a higher business value.

Afterwards, step 1004 calculates a potential business value for each stage/node of the conversion funnel by multiplying the number of visits that reached a specific stage of the conversion funnel (regardless of visiting user dropped out at any later stage) with the business value weight for the specific stage that was calculated by step 1003. Step 1004 may, for a specific node of the conversion funnel filter those visits from the set of visits selected by step 1001 that followed the conversion funnel until the specific node was reached.

Following step 1005 may then rank the nodes of conversion funnel by the highest drop of potential business value that was observed on the nodes.

To determine the business value drop of a specific conversion funnel node, step 1005 may first determine the number of visits that reached the specific node and deviated from the conversion funnel immediately after specific node. Referring again to the example of FIG. 11, for node 1102, step 1005 may identify all visits that navigated from node 1100 to 1102 and then continued with a page/node that different to node 1105 0r 1106. The so determined number of dropped off visits may be multiplied by the business value weight to calculate a business value drop off for each conversion funnel node.

The conversion funnel nodes may then be ranked and assigned an optimization priority according to their calculated business value drop off, where conversion funnel nodes with higher business value drop off are assigned a higher optimization priority. The intention of this ranking is to identify those nodes of the conversion funnel for which an optimization (i.e., change of visualization, layout, functionality, usability of the node to make it more attractive to stay on the conversion funnel and thus reduce the number of drop offs) has the greatest commercial impact.

For simple, linear conversion funnels containing only one path from an entry to a conversion page, the benefits of a business value based analysis may be limited, as proportions of business value contributions and frequencies of converting visits may be similar for the stages of such simple conversion funnels.

For more complex funnels, which provide multiple paths from entry to conversion page, such an analysis may provide additional, valuable insights, as it may reveal that conversion funnel paths which attract lower numbers of users still represent a considerable contribution to overall generated business value, because user navigating via this less used conversion path on average create more business value.

The process then ends with step 1006.

For brevity and understanding a simplified example of a conversion funnel was used herein, which contains a sequence of web pages that represent desired navigation paths of a user through a web application. It is noteworthy that in more dynamic environments, like e.g. single-page applications, where users no longer navigate between different web pages, the user stays on one web page which is then dynamically changed in response to the interactions of the user with the page, a conversion funnel may no longer be represented by a set of web pages that are visited by a user, but by a sequence of state changes of the web page viewed by the user. The above-described technologies to evaluate the commercial efficiency of alternative paths through a conversion funnel may also be applied in such situations. Only marginal adaptations for the previously presented analysis approach are required to also cover those scenarios. Those adaptations include the monitoring of state changes of web pages and recognition of those state changes as elements of a user visit, the aggregation of business values to web page states instead of web pages and the notation of a conversion funnel in form of sequences of web page state changes instead of sequences of web pages. Hybrid scenarios, where some portions of a conversion funnel are implemented as web page state changes and other portions are implemented as conventional navigation paths between web pages are also supported by the above presented technologies.

Coming now to FIG. 11, which exemplary describes the business value driven analysis of alternative conversion funnel paths.

An exemplary conversion funnel is given by a starting page 1100 from which a navigation link 1101 leads to page 1102. At page 1102 the funnel splits into navigation links 1103 and 1104 which lead to page 1105 and 1106 respectively. Navigation links 1107 and 1108 lead from page 1105 and 1106 to page 1109, which merges the alternative paths. Navigation link 1110 leads to page 1111, on which business relevant activities (i.e., purchasing activities) may be performed. During an observation period, 120 converting visits may be observed, which in sum generated a business value of 12 k (currency units) on page 1111. Visit monitoring data shows that 100 converting visits used the navigation path via page 1105 and 20 converting visits used the path via 1106. Business value quantity data extracted from those visits also shows that visits using the 1106 path generated 11.5 k business value and visits using the 1105 path generated 0.5 k business value.

This data may be used to calculate a business value weight for each page of the conversion funnel by dividing the aggregated business value generated by passing converting transactions by the number of passing converting transactions. For pages 1100, 1102, 1109 and 1111, this weight is 100, as 120 converting transactions passed these pages and the aggregated business value for these transactions is 12 k. Page 1105 had 100 passing converting transactions, which generated a business value of 0.5 k, giving it a weight of 5 and page 1106 has 20 visits with a business value of 11.5 k, giving it a weight of 575.

After the weights of individual pages are calculated, drop off data for each page (i.e., number of visits that left the conversion funnel on the specific page) may be used to calculate a potential business value for each page. The potential business value may be calculated by multiplying the number of visits that entered a specific page with the business value weight of this page. For page 1100, 2140 visits are registered, giving it a potential business value of 214 k (business value weight of 100 multiplied by the number of visits entering the page). 610 visits drop off at page 1100, the remaining 11530 visits reach page 1102, giving it a potential business value of 153 k (1530 multiplied by 100). 760 visits drop of at page 1102 and of the remaining 770 visits 730 navigate to page 1105 and 40 to page 1106. Page 1105 has a potential business value of 3.7 k (730 entering visits multiplied by 5) and page 1106 of 2 k (40 entering visits multiplied by 575). 540 and 10 visits drop off at page 1105 and page 1106 respectively. The remaining 220 visits reaching page 1109 give it a potential business value of 22 k (220 multiplied by 100).

The drop off data of page 1105 and 1106 may be used to calculate a loss of potential business value for those nodes. 540 visits drop of at page 1105, giving it a loss of potential business value of 2.7 k and the 10 visits that drop of at page 1106 give it a loss of potential business value of 5.8 k. This analysis shows that, from a business value perspective, the conversion path through 1106 is more important than the path through page 1105, as both the amount of business value and the amount of lost potential business value is higher for the path through 1106. According to the results of a business value related analysis, efforts to optimize the business-efficiency of the conversion funnel would best be directed to page 1106.

An analysis that is solely based on visit frequency and drop off data would incorrectly select page 1105 as optimization target as both frequency and drop off data are higher for this page.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for monitoring a distributed computer transaction executing in a distributed computing environment, comprising:
    receiving, by a monitoring server, transaction trace data that identifies a computer transaction which executed in the distributed computing environment, where the transaction trace data includes data describing service calls executed during the computer transaction;
    identifying, by the monitoring server, a particular service call that indicates a business relevant activity of the computer transaction from the transaction trace data, where the business relevant activity indicates a commercial transaction and the particular service call is executed as part of the computer transaction;
    quantifying, by the monitoring server, value of the commercial transaction based in part of server call parameters for the particular service call contained in the transaction trace data;
    identifying, by the monitoring server, topology entities on which the business relevant activity was performed using a topology model, where the topology model comprises topology entities which collectively describe the distributed computing environment and defines relationships between the topology entities, and topology entities include services, processes and host computing devices, where identifying the topology entities is based in part on a service topology identifier for the particular service call contained in the transaction trace data;

identifying, by the monitoring server, another service call as a contributing activity of the computer transaction, where the another service call is one of a service call executed as part of the computer transaction occurring before the particular service call and a service call executed as part of the computer transaction that called the particular service call; and identifying, by the monitoring server, topology entities on which the another service call was performed using the topology model wherein identifying another service call includes maintaining a list of service executions, where each entry in the list of service executions contains an identifier for the service execution and a start time for the service execution, comparing start time for a given entry of the list of service executions with start time of the particular service call, and selecting the service execution identified by the given entry as another service in response to the start time stored in the given entry before the start time of the particular service call.

2. The computer-implemented method of claim 1 wherein identifying a business relevant activity further comprises identifying a service call during the computer transaction, where an identifier for the service matches a business relevant extractor rule.

3. The computer-implemented method of claim 1 wherein the transaction trace data is captured by agents instrumented into web browsers.

4. The computer-implemented method of claim 1 wherein the topology entities include services provided by processes, processes executed on host computers, host computers, and processes executed in containers which are provided by host computers.

5. The computer-implemented method of claim 1 wherein identifying topology entities on which the business relevant activity was performed and identifying topology entities on which the another service was performed further comprises assigning and aggregating the value of the commercial transaction at each of the identified topology entities in the topology model.

6. The computer-implemented method of claim 5 further comprises receiving a report request; and, in response to receiving the report request, generating a visualization of the topology model, where an aggregated value of business activity is shown for the topology entities in the topology model.

7. The computer-implemented method of claim 5 further comprises
identifying an origin for the computer transaction;
identifying other computer transactions initiated from the origin and proximate in time to the computer transaction;
identifying additional topology entities associated with execution of the other computer transactions using the topology model; and
assigning and aggregating the value of the commercial transaction at each of the additional topology entities.

8. The computer-implemented method of claim 1 further comprises for a given service during a certain time period, retrieving data points for business relevant activities having a given type;
for the given service during the certain time period, retrieving data points for a performance metric;
pairing the data points for the business relevant activities with the data points for the performance metric having similar timestamps; and
analyzing the pairs of data points to determine dependency between the business relevant activities having the given type and the performance metric.

9. The computer-implemented method of claim 8 wherein the performance metric is further defined as response time and the pairs of data points are analyzed using linear regression.

10. The computer-implemented method of claim 1 further comprises
receiving data describing a conversion funnel, where the data includes an entry page, a conversion page, and one or more paths interconnecting the entry page to the conversion page;
identifying a subset of computer transactions as converting transactions, where each computer transaction in the subset of computer transactions reach a given conversion page and resulted in a commerce transaction occurring on the given conversion page;
identifying visits associated with the converting transactions as converting visits;
for each converting visit, determining paths traversed during a given converting visit and accumulating quantity of the commercial transaction at each node along the paths traversed during a given visit, thereby yielding an aggregated business value for each node; and
for each node in the conversion funnel, calculating a business value weight for a given node by dividing the aggregated business value for the given node by a number of converting visits which passed through the given node; and
for each node in the conversion funnel, determining potential business value for a given node by multiplying the number of visits that entered the given node with business value weight assigned to the given node.

11. The method of claim 10 further comprises
for each node in the conversion funnel, calculating a drop off value, where the drop off value is a number of visits which entered a given node but did not continue traversing a path in the conversion funnel;
for each node in the conversion funnel, determining a business value drop off for a given node by multiplying the drop off value for a given node by the business value weight assigned to the given node; and
ranking the nodes of the conversion funnel according to the highest business value drop off.

12. The computer-implemented method of claim 1 further comprises
for a given topology entity, comparing business value contribution of the given topology entity to resource allocation for the given topology entity; and
identifying the given topology entity as an optimization candidate in response to the resource allocation for the given topology entity exceeding the business value contribution for the given topology entity.

13. A computer-implemented method for monitoring a distributed computer transaction executing in a distributed computing environment, comprising:
receiving, by a monitoring server, transaction trace data that identifies a computer transaction which executed in the distributed computing environment, where the transaction trace data includes data describing service calls executed during the computer transaction;

identifying, by the monitoring server, a business relevant activity of the computer transaction from the transaction trace data by identifying a service executing during the computer transaction, where an identifier for the identified service matches a first criterion of a business value extraction rule;

quantifying, by the monitoring server, business value associated with execution of the identified service in accordance with a second criterion of the business value extraction rule;

identifying, by the monitoring server, topology entities on which the business relevant activity was performed using a topology model, where the topology model includes topology entities which collectively describe the distributed computing environment and defines relationships between the topology entities, and topology entities include services, processes and host computing devices, where identifying the topology entities is based in part on a service topology identifier for the particular service call contained in the transaction trace data;

identifying, by the monitoring server, another service call as a contributing activity of the computer transaction, where the another service call is one of a service call executed as part of the computer transaction occurring before the identified service and a service call executed as part of the computer transaction that is called from the identified service; and identifying, by the monitoring server, topology entities on which the another service call was performed using the topology model wherein identifying another service call includes maintaining a list of service executions, where each entry in the list of service executions contains an identifier for the service execution and a start time for the service execution, comparing start time for a given entry of the list of service executions with start time of the identified service call, and selecting the service execution identified by the given entry as another service in response to the start time stored in the given entry before the start time of the identified service call.

14. The computer-implemented method of claim 13 wherein business relevant activities include a purchase transaction or registration of a new user.

15. The computer-implemented method of claim 13 wherein the transaction trace data is captured by agents instrumented into web browsers and application processes.

16. The computer-implemented method of claim 13 wherein the topology entities include services provided by processes, processes executed on host computers, host computers, and processes executed in containers which are provided by host computers.

17. The computer-implemented method of claim 13 wherein identifying topology entities on which the another service call was performed and identifying topology entities on which the contributing activities were performed further comprises accumulating business value at each of the identified topology entities in the topology model.

18. The computer-implemented method of claim 17 wherein accumulating business value at each of the identified topology entities in the topology model includes aggregating business value generated by a plurality of computer transactions executed during a monitored time period.

19. The computer-implemented method of claim 17 wherein accumulating business value at each of the identified topology entities in the topology model includes creating a time series for business relevant activities occurring during a monitored time period.

20. The computer-implemented method of claim 17 further comprises receiving a report request; and, in response to receiving the report request, generating a visualization of the topology model, where an aggregated value of business activity is shown for the topology entities in the topology model.

21. The computer-implemented method of claim 17 further comprises
identifying an origin for the computer transaction;
identifying other computer transactions initiated from the origin and executed before the computer transaction;
identifying additional topology entities associated with execution of the other computer transactions using the topology model; and
assigning and aggregating the value of the commercial transaction at each of the additional topology entities.

22. The computer-implemented method of claim 13 further comprises
receiving data describing a conversion funnel, where the data includes an entry page, a conversion page, and one or more paths interconnecting the entry page to the conversion page;
identifying a subset of computer transactions as converting transactions, where each computer transaction in the subset of computer transactions reach a given conversion page and resulted in a commerce transaction occurring on the given conversion page;
identifying visits associated with the converting transactions as converting visits;
for each converting visit, determining paths traversed during a given converting visit and accumulating quantity of the commercial transaction at each node along the paths traversed during a given visit, thereby yielding an aggregated business value;
for each node in the conversion funnel, calculating a business value weight for a given node by dividing the aggregated business value for the given node by a number of converting visits which passed through the given node; and
for each node in the conversion funnel, determining potential business value for a given node by multiplying the number of visits that entered the given node with business value weight assigned to the given node.

23. The method of claim 22 further comprises
for each node in the conversion funnel, calculating a drop off value, where the drop off value is a number of visits which entered a given node but did not continue traversing the conversion funnel after the given node;
for each node in the conversion funnel, determining a business value drop off for a given node by multiplying the drop off value for a given node by the business value weight assigned to the given node;
ranking the nodes of the conversion funnel by their business value drop of; and
notifying nodes with highest business value drop off as optimization candidates.

24. A non-transitory computer-readable medium having computer-executable instructions that, upon execution of the instructions by a processor of a computer, cause the computer to:
receive transaction trace data that identifies a computer transaction which executed in the distributed computing environment, where the transaction trace data includes data describing service calls executed during the computer transaction;

identify a particular service call that indicates a business relevant activity of the computer transaction from the transaction trace data, where the business relevant activity indicates a commercial transaction and the particular service call is executed as part of the computer transaction;

quantify value of the commercial transaction based in part of server call parameters for the particular service call contained in the transaction trace data;

identify topology entities on which the business relevant activity was performed using a topology model, where the topology model includes topology entities which collectively describe the distributed computing environment and defines relationships between the topology entities, and topology entities include services, processes and host computing devices, where identifying the topology entities is based in part on a service topology identifier for the particular service call contained in the transaction trace data;

identify another service call as a contributing activity of the computer transaction, where the another service call is one of a service call executed as part of the computer transaction occurring before the particular service call and a service call executed as part of the computer transaction that is called from the particular service call; and identify topology entities on which the another service call was performed using the topology model wherein identifying another service call includes maintaining a list of service executions, where each entry in the list of service executions contains an identifier for the service execution and a start time for the service execution, comparing start time for a given entry of the list of service executions with start time of the particular service call, and selecting the service execution identified by the given entry as another service in response to the start time stored in the given entry before the start time of the particular service call.

25. The non-transitory computer-readable medium of claim 24 wherein the computer-executable instructions further cause the computer to identify a business relevant activity by identifying a service call during the computer transaction, where an identifier for the service matches a business relevant extractor rule.

26. The non-transitory computer-readable medium of claim 24 wherein the topology entities include services provided by processes, processes executed on host computers, host computers, and processes executed in containers which are provided by host computers.

27. The non-transitory computer-readable medium of claim 24 wherein the computer-executable instructions further cause the computer to identify topology entities on which the business relevant activity was performed and identify topology entities on which the another service call was performed by assigning and aggregating the value of the commercial transaction at each of the identified topology entities in the topology model.

28. The non-transitory computer-readable medium of claim 27 wherein the computer-executable instructions further cause the computer to receive a report request; and, in response to receiving the report request, generate a visualization of the topology model, where an aggregated value of business activity is shown for the topology entities in the topology model.

* * * * *